US009767563B2

(12) United States Patent
Takemoto et al.

(10) Patent No.: US 9,767,563 B2
(45) Date of Patent: Sep. 19, 2017

(54) IMAGE PROCESSING APPARATUS AND METHOD FOR OBTAINING POSITION AND ORIENTATION OF IMAGING APPARATUS

(71) Applicant: CANON KABUSHIKI KAISHA, Tokyo (JP)

(72) Inventors: Kazuki Takemoto, Kawasaki (JP); Kiyohide Satoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/823,263

(22) Filed: Aug. 11, 2015

(65) Prior Publication Data
US 2015/0348272 A1 Dec. 3, 2015

Related U.S. Application Data

(63) Continuation of application No. 12/257,260, filed on Oct. 23, 2008, now Pat. No. 9,135,513.

(30) Foreign Application Priority Data

Oct. 30, 2007 (JP) .................................. 2007-282350

(51) Int. Cl.
G06K 9/00 (2006.01)
G06T 7/00 (2017.01)
(Continued)

(52) U.S. Cl.
CPC .............. *G06T 7/0042* (2013.01); *G06K 9/32* (2013.01); *G06T 7/60* (2013.01); *G06T 7/73* (2017.01);
(Continued)

(58) Field of Classification Search
CPC ................. G01S 3/7865; G06T 7/2033; G06T 2207/10012; G06T 7/60; G06T 17/00; G06T 7/001; G06T 7/0022; G06T 7/004; G06T 7/0042; G06T 7/20; G06T 11/60; G08B 13/19602; G11B 27/28; H04N 5/147; H04N 7/183; H04N 5/23219; H04N 5/23222; H04N 9/3173; H04N 13/0207;
(Continued)

(56) References Cited

U.S. PATENT DOCUMENTS 5,414,474 A * 5/1995 Kamada .................. G06T 7/246
348/135
5,982,912 A * 11/1999 Fukui .................. G06K 9/00221
382/115
(Continued)

*Primary Examiner* — Vu Le
*Assistant Examiner* — Aklilu Woldemariam
(74) *Attorney, Agent, or Firm* — Canon U.S.A., Inc. IP Division

(57) ABSTRACT

An image processing apparatus obtains location information of each image feature in a captured image based on image coordinates of the image feature in the captured image. The image processing apparatus selects location information usable to calculate a position and an orientation of the imaging apparatus among the obtained location information. The image processing apparatus obtains the position and the orientation of the imaging apparatus based on the selected location information and an image feature corresponding to the selected location information among the image features included in the captured image.

10 Claims, 22 Drawing Sheets

(51) Int. Cl.
*G06T 7/60* (2017.01)
*H04N 13/02* (2006.01)
*G06K 9/32* (2006.01)
*G06T 7/73* (2017.01)

(52) U.S. Cl.
CPC .......... *H04N 13/0207* (2013.01); *G06K 9/00* (2013.01); *G06T 2207/10012* (2013.01)

(58) Field of Classification Search
CPC .......... H04N 1/32512; H04N 1/32529; G06F 3/0425; G06F 3/011; G06F 3/017; G06F 3/0481; G06F 17/30; G06F 21/604; G06F 17/30265; G06K 9/00208; G06K 9/00134; G06K 9/32; G06K 9/00812; G06K 2209/05; A61B 1/00147; A61B 6/584; A61B 6/12; A61B 8/5246; A61B 2034/2055; A61B 90/36; A61B 1/00009; A61B 1/00045; G02B 2027/014; G01B 11/002; G01B 7/003; H04M 1/0264; G05D 1/0274; H04L 12/581; H04L 51/04
USPC ............... 382/103, 118, 128, 190, 225, 154; 348/208, 231, 333, 565, 700
See application file for complete search history.

(56) References Cited

U.S. PATENT DOCUMENTS

| | | | | |
|---|---|---|---|---|
| 6,160,907 A * | 12/2000 | Robotham | ............ | G06T 7/0022 345/419 |
| 6,690,819 B1 * | 2/2004 | Teraji | ............ | G06K 9/32 348/126 |
| 6,849,048 B2 * | 2/2005 | Omiya | ............ | G06T 7/20 128/916 |
| 7,130,754 B2 * | 10/2006 | Satoh | ............ | G06T 7/73 702/150 |
| 7,558,403 B2 * | 7/2009 | Katayama | ............ | G06T 19/006 382/103 |
| 7,693,308 B2 * | 4/2010 | Ono | ............ | G06K 9/00255 340/5.2 |
| 7,812,871 B2 * | 10/2010 | Takemoto | ............ | G06F 3/0321 348/286 |
| 8,078,991 B2 * | 12/2011 | Kanemitsu | ............ | H04N 1/00464 715/204 |
| 8,154,645 B2 * | 4/2012 | Sumioka | ............ | H04N 5/23293 348/239 |
| 8,155,480 B2 * | 4/2012 | Shiozawa | ............ | A61B 6/08 382/132 |
| 2001/0026634 A1 * | 10/2001 | Yamaguchi | ............ | G06K 9/00288 382/118 |
| 2002/0075286 A1 * | 6/2002 | Yonezawa | ............ | G02B 27/017 345/679 |
| 2003/0032484 A1 * | 2/2003 | Ohshima | ............ | A63F 13/10 463/43 |
| 2003/0128876 A1 * | 7/2003 | Yamaguchi | ............ | G06K 9/6211 382/190 |
| 2003/0187350 A1 * | 10/2003 | Omiya | ............ | G06T 7/20 600/428 |
| 2004/0085443 A1 * | 5/2004 | Kallioniemi | ............ | G01N 1/36 348/135 |
| 2004/0167667 A1 * | 8/2004 | Goncalves | ............ | G01C 21/12 700/245 |
| 2004/0183775 A1 * | 9/2004 | Bell | ............ | G06F 3/011 345/156 |
| 2004/0218098 A1 * | 11/2004 | Lee | ............ | H04N 5/45 348/565 |
| 2006/0146147 A1 * | 7/2006 | Misawa | ............ | H04N 1/00326 348/231.4 |
| 2006/0239525 A1 * | 10/2006 | Katayama | ............ | G06T 19/006 382/128 |
| 2007/0008340 A1 * | 1/2007 | Endo | ............ | G06T 19/006 345/633 |
| 2007/0139321 A1 * | 6/2007 | Takemoto | ............ | G06F 3/0325 345/87 |
| 2008/0186386 A1 * | 8/2008 | Okada | ............ | H04N 5/23248 348/208.4 |
| 2008/0187205 A1 * | 8/2008 | Shiozawa | ............ | A61B 6/08 382/132 |
| 2008/0285854 A1 * | 11/2008 | Kotake | ............ | G06T 7/73 382/190 |
| 2009/0110241 A1 * | 4/2009 | Takemoto | ............ | G06K 9/32 382/103 |
| 2010/0034432 A1 * | 2/2010 | Ono | ............ | G06K 9/2027 382/118 |
| 2010/0214284 A1 * | 8/2010 | Rieffel | ............ | G06T 17/00 345/419 |

* cited by examiner

FIG. 21

| REGISTRATION NUMBER | TYPE | 3-DIMENSIONAL POSITION | SELECTED STATE PARAMETER | ENABLING STATE PARAMETER |
|---|---|---|---|---|
| 1 | 4 | (102.3, 400.4, 200.8) | 0 | 1 |
| 1 | 4 | (102.3, 400.4, 200.8) | 0 | 1 |
| 1 | 4 | (102.3, 400.4, 240.8) | 0 | 1 |
| 1 | 4 | (102.3, 440.4, 240.8) | 0 | 1 |
| 2 | 1 | (2.3, 440.4, 0.8) | 0 | 1 |
| 3 | 2 | (330.4, 569.5, 244.6) | 0 | 1 |
| 3 | 2 | (230.1, 569.5, 244.3) | 0 | 1 |
| 4 | 3 | (130.9, 500.0, 404.4) | 0 | 1 |
| 5 | 3 | (174.6, 404.1, 208.3) | 0 | 1 |

IMAGE PROCESSING APPARATUS AND METHOD FOR OBTAINING POSITION AND ORIENTATION OF IMAGING APPARATUS

CROSS REFERENCE TO RELATED APPLICATIONS

The present application is a continuation of U.S. patent application Ser. No. 12/257,260, filed on Oct. 23, 2008, entitled "IMAGE PROCESSING APPARATUS AND METHOD FOR OBTAINING POSITION AND ORIENTATION OF IMAGING APPARATUS", the content of which is expressly incorporated by reference herein in its entirety. Further, the present application claims priority from Japanese Patent Application No. 2007-282350, filed Oct. 30, 2007, which is also hereby incorporated by reference herein in its entirety.

BACKGROUND OF THE INVENTION

Field of the Invention

The present invention relates to a technique capable of obtaining position and orientation information of an imaging apparatus based on an image captured by the imaging apparatus.

Description of the Related Art

There is a conventional method for measuring a position and an orientation of a physical object in a space which includes capturing an image of the physical object which moves in the space, with a camera and detecting a position of a projection image (referred to as a "image feature") on an image of a geometric shape or a color feature (referred to as a "geometric feature"). The method further includes capturing the image of the geometric feature in the space and estimating a position and an orientation of the camera in the space. The above-described position/orientation measurement method requires preparing three-dimensional location information of each geometric feature involved in an image (hereinafter, referred to as "feature location information" or "location information").

There is a simple method using an appropriate measurement device or a ruler to measure location information of each geometric feature in a physical space. However, such a method is not useful since handling such a measurement device or a ruler is troublesome for a user and measurement accuracy may not be obtained as expected. To solve this problem, as discussed in Bolan Jiang, Ulrich Neumann: "Extendible Tracking by Line Auto-Calibration," isar, IEEE and ACM International Symposium on Augmented Reality (ISAR'01), p.p. 97-106, 2001 (hereinafter, referred to as "literature 1"), location information of a geometric feature in a space can be automatically calculated based on coordinates of an image feature detected by images captured by a plurality of cameras whose positions and orientations are known beforehand.

When the method discussed in the literature 1 is used to automatically generate location information, location information including a large error may be registered. Even if the location information is accurately generated, it may not be suitable for estimating camera position/orientation. For example, if a moving object is present in a space and geometric information on the object is registered, a geometric feature may deviate from a reference coordinate system and may not serve as a reference in obtaining the camera position/orientation.

Therefore, the moving object influences an estimation value of the camera position/orientation and causes an error. Further, if a registered geometric feature has a repetition pattern that is difficult to discriminate (e.g., a blind or a floor design), the geometric feature tends to be erroneously identified. Accuracy in estimating the camera position/orientation will deteriorate. If a number of unnecessary geometric features increases, processing speed will decrease.

Match moving technique is usable to generate a moving path of a camera based on image features in a moving image captured by a moving camera (referred to as "background art 1"). The background art 1 can automatically obtain feature location information by tracking a plurality of characteristic points on a moving image. However, according to the background art 1, if an object moving in a space is automatically extracted and tracked, an appropriate camera moving path may not be generated. To solve this problem, a user interface is available to manually select image feature(s) that disturb generation of the camera moving path. For example, the interface enables a user to designate a two-dimensional closed region encompassing an image feature which is unnecessary to track on each captured still image, so that no tracking is performed in the designated region.

Further, in the background art 1, when a moving image includes consecutively captured images of an object (or region) to be removed, it is possible to designate a specific region on a plurality of still images (key frames) of the moving image and remove the related regions from a tracking target in the moving image by performing interpolation between the images. However, if a selected region is once out of a frame image, work efficiency deteriorates because it is necessary to select the region again.

FIG. 2 is a block diagram illustrating a functional configuration of an apparatus capable of estimating position/orientation of a camera in each frame of a moving image using the match moving technique discussed in the background art 1. As illustrated in FIG. 2, a desk 100A (physical object) is located in a physical space. In the physical space, a video camera (hereinafter, simply referred to as a "camera") 110 can freely move to capture a moving image. The moving image captured by the camera 110 is stored in a moving image storage unit 210 via an image input unit 120.

The following processing is basically applied to a moving image (an assembly of still images) recorded in the moving image storage unit 210, if not specifically mentioned. A moving image input unit 220 reads a moving image as a processing target from the moving image storage unit 210. The moving image input unit 220 transmits the readout moving image to an image feature detection unit 130B.

The image feature detection unit 130B detects an image feature (a projection image of a geometric feature (corner points of the desk 100A, setup points of legs of the desk 100A, etc.) on a captured image) from each frame constituting the moving image. An image feature storage unit 230 stores, for each frame, image coordinates of the image feature detected by the image feature detection unit 130B. The image feature detection unit 130B can detect image features, which are associated with each other between consecutive frames, using, for example, a conventional image processing technique referred to as a "Harris operator" that is capable of detecting corners of an object on an image.

A display unit 250 displays, at image coordinates detected from a frame image in the moving image storage unit 210 and stored in the image feature storage unit 230, a composite image (i.e., a result reflecting a composite display representing an image feature detected at the image coordinates). The display unit 250 which is configured to display such a composite image enables a user to determine whether a normal camera moving path can be generated.

If a moving image includes a moving object (an object moving in a physical space), a user is required to operate an image feature selection input unit 225 to remove an image feature on the moving object from a frame image. For example, a removal method includes searching a frame image including an image feature to be removed and designating a region of the image feature on a detected frame image as a removal target. For example, a removal region designation method includes setting a polygonal region surrounding a removal target region in all frame images including the removal target region, removing an image feature in the polygonal region of each frame image, and deleting image coordinates representing the removed image feature from the image feature storage unit 230.

An imaging unit position/orientation estimation unit 240 tracks image coordinates remaining in the image feature storage unit 230. The imaging unit position/orientation estimation unit 240 calculates a three-dimensional position (location information) of each geometric feature in the physical space which corresponds to each image feature having been tracked and a moving path of the camera 110 using a conventional method (referred to as a "bundle adjustment method").

The bundle adjustment method includes optimizing the three-dimensional position of an estimated geometric feature and the position/orientation of the camera 110 to minimize a difference between a position of the three-dimensional position of the estimated geometric feature projected on an imaging plane and image coordinates of an actually detected image feature.

The display unit 250 displays three-dimensional position/orientation of the obtained moving path of the camera 110 to let a user confirm a result.

The background art 1 can automatically generate location information even if the image feature is unknown. In the background art 1, when a moving image includes consecutively captured images of an object (or region) to be removed, it is possible to designate a specific region on a plurality of still images (key frames) of the moving image and remove the related regions from a tracking target in the moving image by interpolating between the images.

However, a method for removing an unnecessary image feature (which may cause an estimation error) from a frame image is limited to selecting a two-dimensional image feature in a two-dimensional image. Therefore, as described above, after the selected region is once out of the frame image, it is necessary to re-designate the region of the image feature to be removed if the selected region is necessary for tracking. Thus, work efficiency deteriorates.

FIG. 3 is a block diagram illustrating a functional configuration of an apparatus capable of automatically generating location information of an unknown geometric feature, which is discussed in the literature 1, and estimating position/orientation of the camera 110 (referred to as "background art 2"). In FIG. 3, components similar to those discussed in FIG. 2 are denoted by the same reference numerals.

In FIG. 3, the desk 100A is located in a physical space and a marker 100D is located on the desk 100A. According to the example illustrated in FIG. 3, as discussed in the literature 1, the marker 100D is a square marker whose location information is known beforehand. The marker 100D is, for example, a marker discussed in Kato et al: "An Augmented Reality System and its Calibration based on Marker Tracking", Journal of the Virtual Reality Society of Japan, Vol. 4, No. 4, pp. 607-616 (1999) (hereinafter, referred to as "literature 2").

The camera 110 captures a moving image in the physical space, and successively transmits frame images (images of captures frames) to an image feature detection unit 130C and a display unit 190 via the image input unit 120. The following processing is performed on the frame image of each frame, if not specifically mentioned.

The image feature detection unit 130C performs binarization processing on the frame image received from the image input unit 120 and generates a binary image. The image feature detection unit 130C detects the marker 100D from the generated binary image. Further, the image feature detection unit 130C detects ridges of the desk 100A and line segments based on color changes. For example, a method discussed in the literature 2 is usable to detect the marker 100D. More specifically, the method includes detecting a rectangular region from the binary image and recognizing the marker 100D based on a pattern in the detected rectangular region.

When the object is a line feature (a line segment connecting two points on the frame image), the image feature detection unit 130C extracts the line segment from the frame image and records image coordinates of two endpoints of the extracted line segment in the location information generation unit 140. If at least one of the endpoints is present on an edge of the frame image, namely when geometric information of the line feature is not completely within the screen, the line feature is discarded. The location information generation unit 140 stores the image coordinates representing the marker 100D and the extracted line feature(s).

The location information generation unit 140 outputs the image coordinates of the marker 100D to an imaging unit position/orientation estimation unit 185 to obtain initial position/orientation of the camera 110. First, the imaging unit position/orientation estimation unit 185 obtains the position/orientation of the camera 110 based on the image coordinates of the marker 100D received from the location information generation unit 140 and "location information of marker 100D" stored beforehand in a location information storage unit 310.

A conventional non-linear optimization calculation can be used to obtain a relative position/orientation relationship between the camera 110 and the marker 100D, as discussed in the literature 2. More specifically, the imaging unit position/orientation estimation unit 185 can obtain the position/orientation of the camera 110 by repetitively performing non-linear optimization to minimize errors between the image coordinates of four vertices of the detected marker 100D and image coordinates obtained when location information of the four vertices of the marker 100D is projected on an imaging plane.

Such processing can be referred to as "non-linear optimization of projection errors" which requires, as initial values, the position/orientation of the camera 110. For example, the position/orientation of the camera 110 estimated in the processing for a preceding frame is usable as the initial values. Further, a reference coordinate system in the physical space defines the location information of the marker 100D. Therefore, by performing coordinate transformation, the imaging unit position/orientation estimation unit 185 can obtain the position/orientation of the camera 110 in the reference coordinate system.

Next, the location information generation unit 140 acquires, from the imaging unit position/orientation estimation unit 185, the position/orientation of the camera 110 obtained by the imaging unit position/orientation estimation unit 185. Then, the location information generation unit 140 obtains a plane including the position of the camera 110 and two points of the line feature on the imaging plane in the reference coordinate system (referred to as a "line candidate plane"), and stores the obtained plane data.

Further, the location information generation unit 140 refers to one or more line candidate planes in the past frame images which are generated from visual points including a line segment similar to the line segment in the frame image of a present frame and exceeding a threshold with respect to a difference from the position/orientation of the camera 110 in the present frame. Then, the location information generation unit 140 generates location information of the line feature based on a crossing line of a plurality of line candidate planes. The literature 1 describes detailed line feature generation processing.

As described above, the location information generation unit 140 can generate the location information of the line feature from the frame image including the line feature. Through such processing, even if the location information of the line feature is unknown, the location information generation unit 140 can generate the location information of the unknown line feature referring to the past information.

The location information storage unit 310 stores the location information of any unknown line feature generated by the location information generation unit 140. The imaging unit position/orientation estimation unit 185 can use the location information stored in the location information storage unit 310 to obtain the position/orientation of the camera 110 based on the frame image of the next frame.

The imaging unit position/orientation estimation unit 185 can use a method for estimating the position/orientation of the camera 110 based on only a line feature which is similar to the non-linear optimization of projection errors applied to the marker 100D. More specifically, the imaging unit position/orientation estimation unit 185 updates the position/orientation of the camera 110 so as to minimize a distance between the image coordinates of projected location information of the line feature and the line feature on the frame image. If the marker 100D is detected on the frame image, the imaging unit position/orientation estimation unit 185 needs not use the line feature or can estimate the position/orientation of the camera 110 by combining the marker 100D and the line feature.

The display unit 190 displays a composite image including an edge model resembling the line feature at a position corresponding to the position/orientation of the camera 110 obtained by the imaging unit position/orientation estimation unit 185 on the frame image entered via the image input unit 120. A user can identify which the line feature is used while confirming contents displayed on the display unit 190.

As described above, the method discussed in the literature 1 can use the line feature which is not registered beforehand as information usable for estimation of the camera position/orientation. In other words, inputting location information of a line feature is unnecessary. Accordingly, work efficiency can be improved. However, an automatically registered line feature may include erroneous location information due to an accumulated error when it is positioned far from a marker or known information, or when it is erroneously detected in an image capturing operation. According to the method discussed in the literature 1, the erroneous location information cannot be removed. Estimation accuracy deteriorates if the erroneous location information is present. The position/orientation of the camera 110 cannot be accurately estimated.

SUMMARY OF THE INVENTION

Exemplary embodiments of the present invention are directed to a technique capable of efficiently obtaining a position and an orientation of an imaging apparatus.

According to an aspect of the present invention, an image processing apparatus includes an acquisition unit configured to acquire an image from an imaging apparatus that captures an image of a physical space, a calculating unit configured to obtain location information of each image feature in the physical space based on image coordinates of the image feature in the captured image, a selection unit configured to select location information usable to calculate a position and an orientation of the imaging apparatus among the location information obtained by the calculating unit, and a calculation unit configured to calculate the position and the orientation of the imaging apparatus based on the location information selected by the selection unit and an image feature corresponding to the selected location information among the image features included in the captured image.

According to another aspect of the present invention, a method for processing an image includes acquiring an image from an imaging apparatus that captures an image of a physical space, obtaining location information of each image feature in the physical space based on image coordinates of the image feature in the captured image, selecting location information usable to calculate a position and an orientation of the imaging apparatus among the obtained location information, and calculating the position and the orientation of the imaging apparatus based on the selected location information and an image feature corresponding to the selected location information among the image features included in the captured image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 21 illustrates an example table storing various pieces of feature location information.

DETAILED DESCRIPTION OF THE EMBODIMENTS

Figure 1:
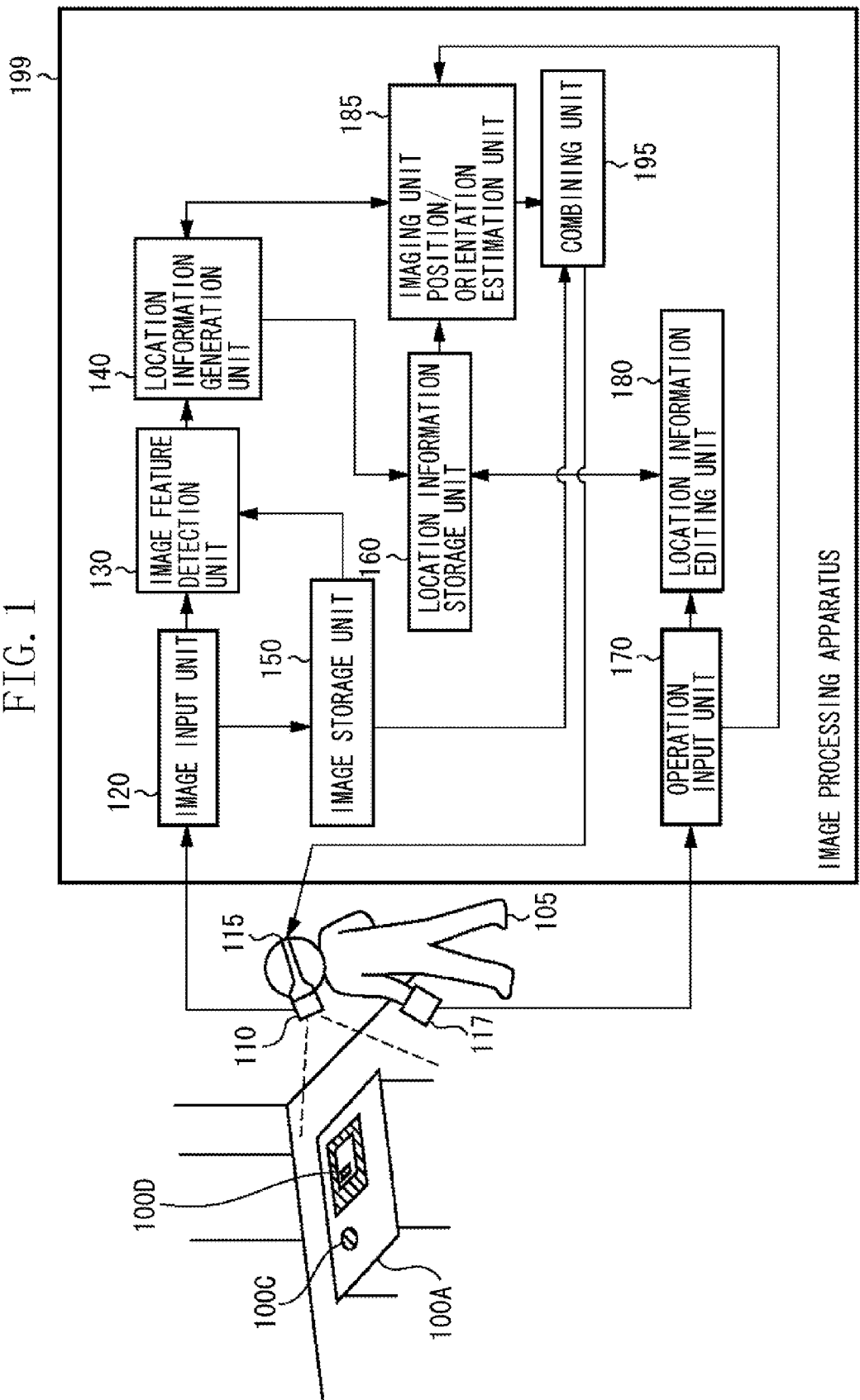
FIG. 1 is a block diagram illustrating a functional configuration of a system according to a first exemplary embodiment of the present invention.
Figure 2:
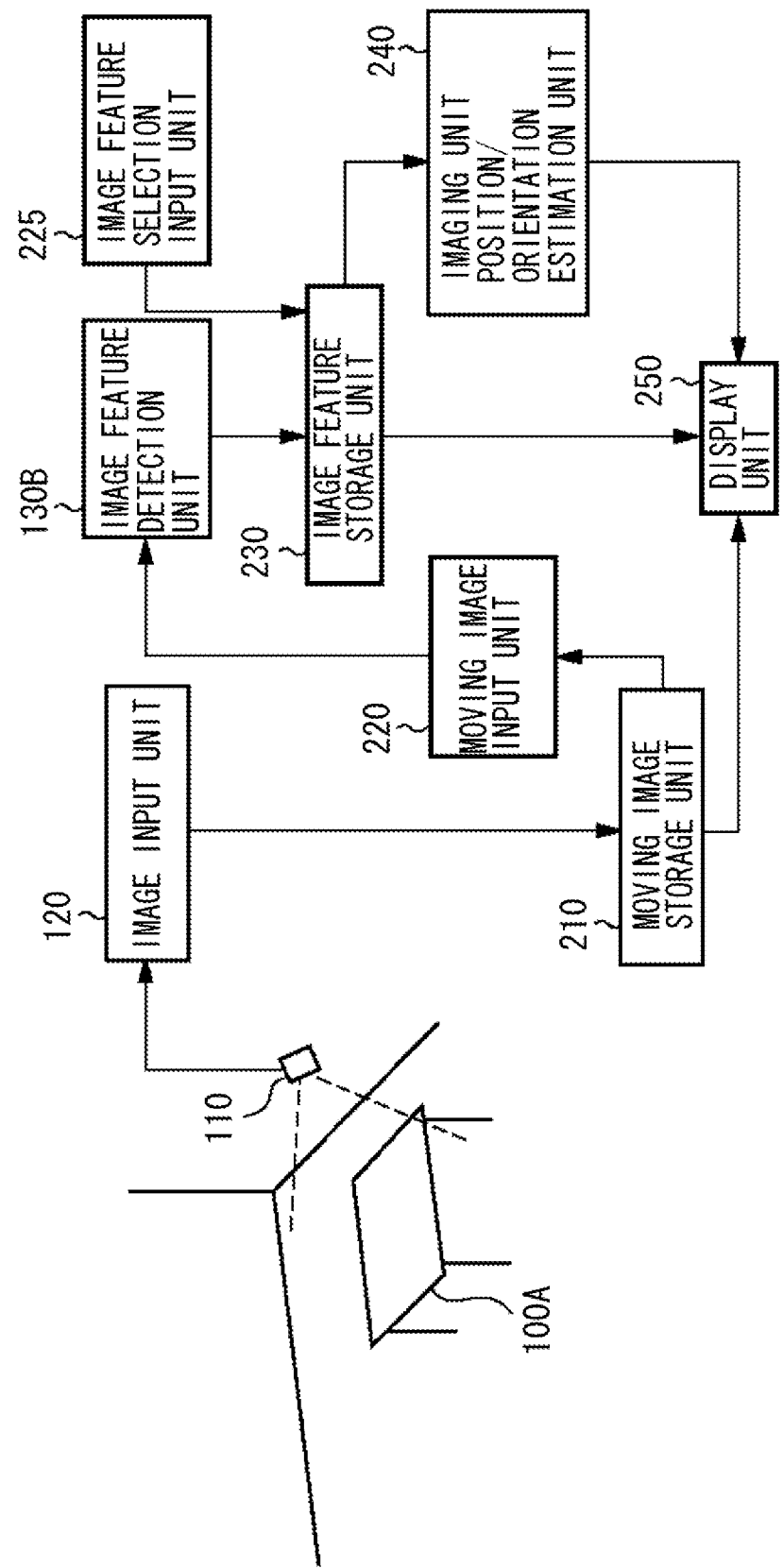
FIG. 2 is a block diagram illustrating a functional configuration of an apparatus capable of estimating a position and an orientation of a camera in each frame of a moving image using a match moving technique.
Figure 3:
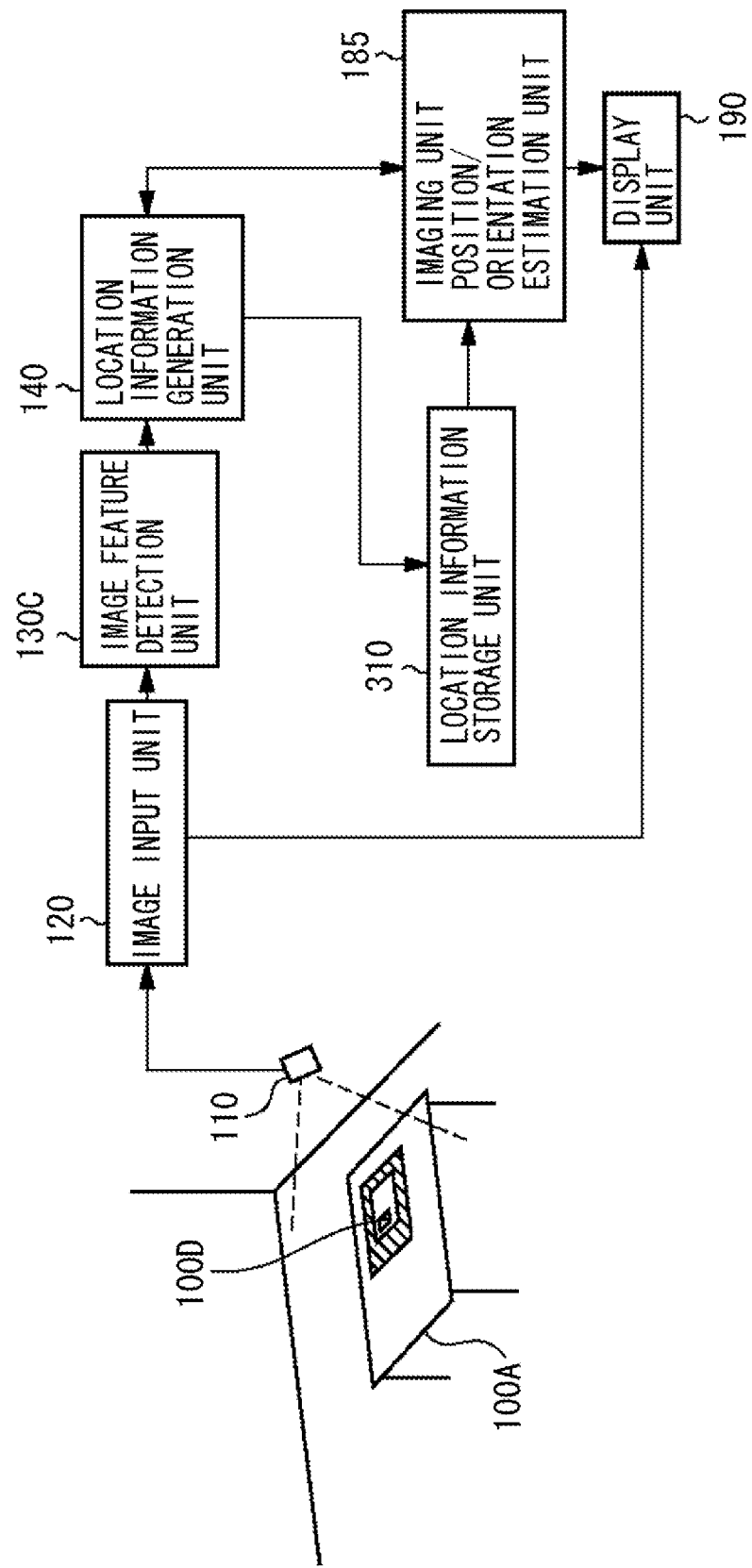
FIG. 3 is a block diagram illustrating a functional configuration of an apparatus capable of automatically generating location information of an unknown geometric feature and estimating a position and an orientation of a camera.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Exemplary embodiments will be described in detail below with reference to the drawings.

First Exemplary Embodiment

As described above, when an image feature is selected by designating a 2D region on an image in the match moving technique, the background art 1 has a problem that once a target object is out of a frame of the image, selection processing of the target object needs to be performed again. The background art 2 cannot remove location information which may include an error and cause an identification error. Therefore, estimation accuracy of a camera position/orientation may deteriorate and processing speed may be decreased by processing unnecessary location information.

A first exemplary embodiment of the present invention automatically acquires location information of a geometric feature existing in a physical space based on a captured image entered from a camera. Further, the present exemplary embodiment provides an interface that enables a user to select a geometric feature adequate for estimating a camera position/orientation.

In the following description, to "select" indicates enabling or disabling information about a specific geometric feature usable to estimate the camera position/orientation according to a user's operation. The information enabling/disabling processing can prevent estimation accuracy from deteriorating or can prevent processing speed from decreasing.

If a user selects the geometric feature usable to estimate the camera position/orientation, the present exemplary embodiment performs processing for estimating the camera position/orientation based on the selected geometric feature and causes a display unit to notify the user of an estimated result. Thus, the camera position/orientation estimation processing according to the present exemplary embodiment is applicable to various sites. In the following description, selecting location information of a geometric feature is equivalent to selecting the geometric feature depending on a case.

FIG. 1 is a block diagram illustrating a functional configuration of a system according to the first exemplary embodiment. The system illustrated in FIG. 1 includes a head mounted display (HMD) 115 that a user 105 can wear, a camera 110 attached to the HMD 115, an operation input device 117 that the user 105 can operate, and an image processing apparatus 199.

When the user 105 wears the HMD 115, the camera 110 is positioned near eyes (a point of view) of the user 105. The HMD 115 includes a display screen which is positioned in front of eyes of an observer who wears the HMD 115 to display an image based on an image signal transmitted from the image processing apparatus 199. The displayed image will be described below.

The camera 110 captures a moving image in the physical space and sends an image signal representing an image of each captured frame (frame image, captured image) to the image processing apparatus 199.

The above-described desk 100A is disposed in the physical space and the above-described marker 100D is on the desk 100A. Further, a black marker 100C (referred to as centroid feature) is placed on the desk 100A. The marker 100D is a square mark whose location information (a position and an orientation of the marker 100D in a reference coordinate system) is known beforehand. A location information storage unit 160 stores the location information of the marker 100D.

Only one marker 100D is present in the physical space illustrated in FIG. 1 and the present exemplary embodiment is described based on this premise. However, two or more markers 100D may be present in the physical space, as discussed in the literature 2. If two or more markers 100D are present in the physical space, respective markers 100D have different patterns. The marker 100D is not limited to a square shape and can have any other polygonal (e.g., triangular, rectangular, pentagonal, or hexagonal) shape which is usable to calculate a mutual relationship between the marker 100D and the camera 110 in a position and an orientation.

Figure 4:
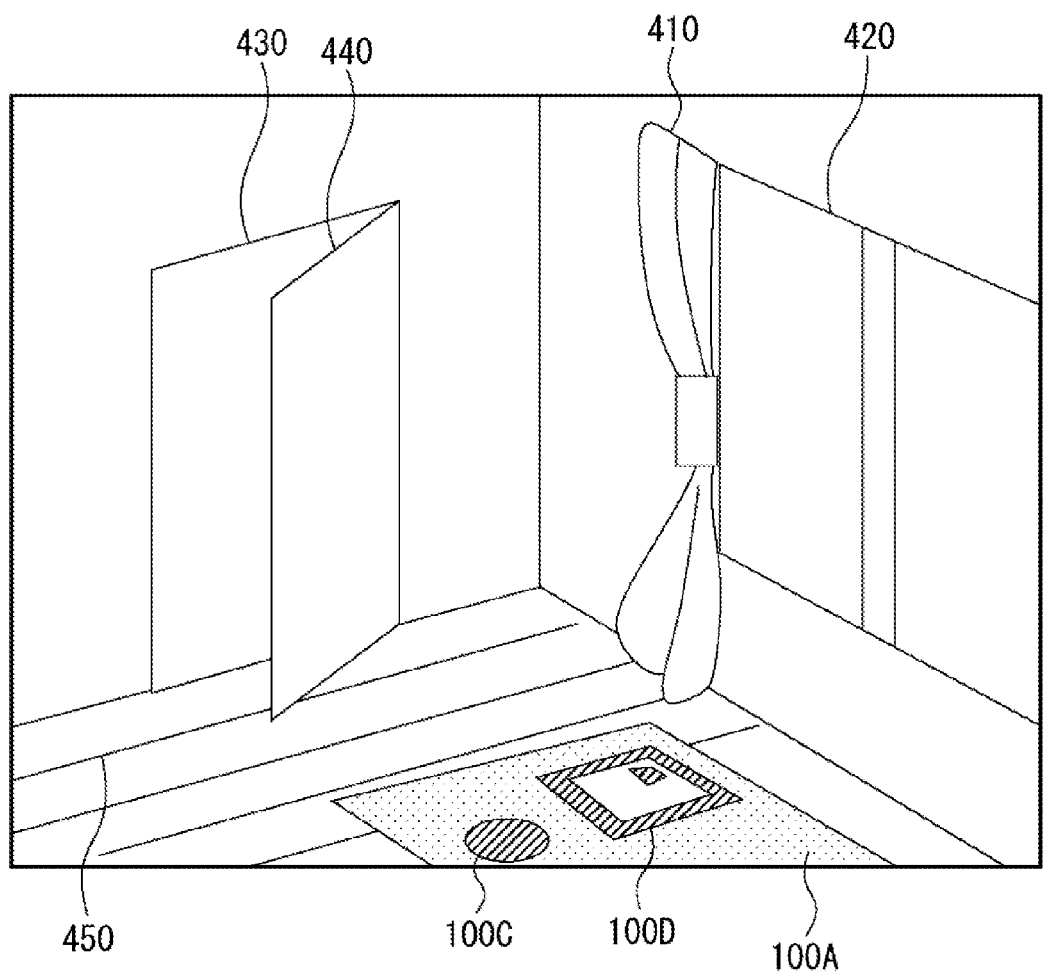
FIG. 4 illustrates an example of a captured image in a frame.

FIG. 4 illustrates an example image of a frame captured by the camera 110. The image includes a curtain 410, a window 420, a door frame 430, a door 440, and a floor design 450, which are present in the physical space, in addition to the desk 100A. The floor design 450 may be registered as a geometric feature having a repetition pattern which is difficult to discriminate. The curtain 410 and the door 440 are movable objects.

Referring back to FIG. 1, the operation input device 117 functions as an operation input interface that enables the user 105 to perform input operations. The operation input device 117 includes a mouse and a keyboard in the present exemplary embodiment, or may include a joystick, a game pad, and any input device which enable the user 105 to perform various input operations.

The image processing apparatus 199 includes the following functional units. An image input unit 120 receives a captured image of each frame transmitted from the camera 110. The image input unit 120 successively transmits captured images to an image feature detection unit 130 and an image storage unit 150. The image feature detection unit 130 detects a geometric feature image (image feature) involved in the captured image received from the image input unit 120. In this case, detecting an image feature is equivalent to obtaining (calculating) image coordinates of the image feature on the captured image.

More specifically, the image feature detection unit 130 detects various image features including point features, line features, the marker 100D, and the centroid feature 100C. Any conventional method for obtaining image coordinates of the point features, the line features, and the marker 100D is usable.

An example method for obtaining the image coordinates of the centroid feature includes labeling a region having a specific color on the captured image and obtaining image coordinates of a centroid point in the regions labeled to the same region as the image coordinates of the centroid feature.

The location information generation unit 140 generates location information of unknown geometric features, similar to the location information generation unit 140 discussed in the literature 1. The location information generation unit 140 stores the location information of unknown geometric features in the location information storage unit 160. Example processing for obtaining the location information of the unknown geometric features is described below in detail.

A method discussed in the literature 1 is usable to generate a line feature. More specifically, if a geometric feature whose location information is already known (the marker 100D in the present exemplary embodiment) is detected as an image feature on the captured image, the imaging unit position/orientation estimation unit 185 estimates a position and an orientation of the camera 110 based on the location information of the known geometric feature and the image coordinates of the geometric feature image (image feature).

The imaging unit position/orientation estimation unit 185 associates image coordinates (coordinates of endpoints) of a line feature in the captured image with the estimated position and orientation of the camera 110. The imaging unit position/orientation estimation unit 185 stores the associated data, as an image feature dataset of the geometric feature, in the location information generation unit 140.

The location information generation unit 140 refers to the camera position involved in the image feature datasets stored therein. and checks whether there are two image feature datasets X and Y satisfying a relationship that a distance between a camera position of the image feature dataset X and a camera position of the image feature dataset Y is equal to or greater than a threshold. If the image feature datasets X and Y satisfying the above-described relationship are stored in the location information generation unit 140, the location information generation unit 140 operates in the following operation.

More specifically, the location information generation unit 140 defines a projection line based on a reference image feature dataset (X) and a recently stored image feature dataset (Y), as described with reference to FIG. 20.

Figure 20:
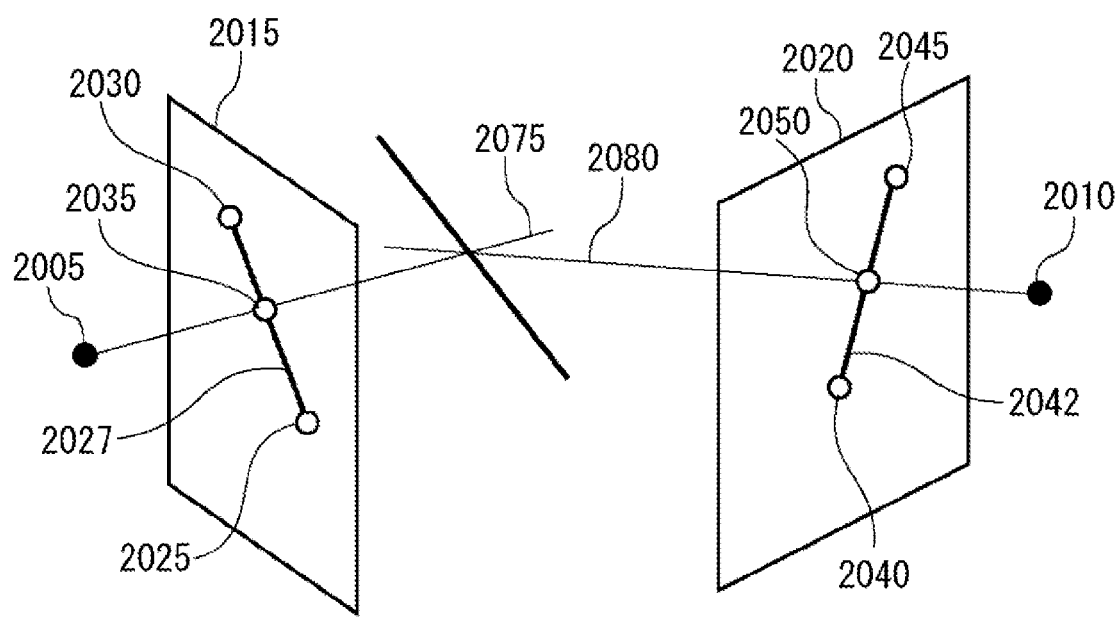
FIG. 20 illustrates example processing for obtaining a projection line from two image feature datasets.

FIG. 20 illustrates example processing for obtaining a projection line from two image feature datasets. In FIG. 20, a straight line 2075 is a projection line of a line feature 2027 detected on a captured image 2015. The straight line 2075 passes a camera position 2005 and a midpoint 2035 between two endpoints 2030 and 2025 of the line feature 2027. Similarly, a straight line 2080 is a projection line of a line feature 2042 detected on a captured image 2020. The straight line 2080 passes a camera position 2010 and a midpoint 2050 between two endpoints 2040 and 2045 of the line feature 2042.

The processing includes determining whether the straight lines 2075 and 2080 (projection lines obtainable from two target image feature datasets) cross each other in an image-captured region. An appropriate threshold can beset to evaluate a distance between two straight lines 2075 and 2080. If it is determined that the straight lines 2075 and 2080 do not cross each other, the processing does not generate location information of a geometric feature. If the straight lines 2075 and 2080 cross each other, it is determined that the line features of two image feature datasets are similar to each other. Then a plane including three points of two endpoints of the line feature and the camera position is calculated respectively.

Among crossing lines of two planes thus obtained, three-dimensional positions of the endpoints 2025 and 2030 reversely projected on a line, on the captured image of the reference image feature dataset, are identified as the location information of the line feature.

With respect to a point feature and a centroid feature, a method similar to that discussed in the literature 1 is usable to obtain location information of an unknown point (point feature and centroid feature). More specifically, the processing includes obtaining a projection line of a reference image feature dataset and, if newly stored image feature datasets satisfy a relationship that a distance between camera positions is equal to or greater than a threshold, determining a crossing with the projection line. If a crossing is present, a crossing point may be identified as location information of an unknown point.

An example method for generating location information of the marker 100D is discussed by Gregory Baratoff, Alexander Neubeck, and Holger Regenbrecht in "Interactive Multi-Marker Calibration for Augmented Reality Applications," ISMAR, Proc. International Symposium on Mixed and Augmented Reality (ISMAR'02), pp. 107-116, 2002.

More specifically, the method includes detecting the marker 100D in a state where the position/orientation of the camera 110 is obtained beforehand, performing coordinate conversion with respect to the relative position and orientation between the camera 110 and the marker 100D, and generating location information of the marker 100D in the reference coordinate system. However, the marker 100D may not be registered beforehand as a known geometric feature. Only minimum location information of any geometric feature for estimating the position/orientation of the camera 110 needs to be registered.

In this case, it is necessary to determine beforehand the position and orientation of "the camera 110 that can capture an image of the known geometric feature" as initial position and orientation. Further, immediately before starting camera position/orientation estimation, it is necessary to locate the camera 110 closely to the predetermined initial position/orientation.

The location information generation unit 140 includes an unestimatable state parameter that indicates whether the position/orientation estimation of the camera 110 in a preceding frame was successful, and a memory storing the above-described image feature datasets. Alternatively, such a memory can be provided as an external memory for the location information generation unit 140, and the location information generation unit 140 manages writing of data to the memory.

The location information storage unit 160 stores feature location information including the location information generated by the location information generation unit 140. Every time the location information generation unit 140 generates the location information, the location information storage unit 160 stores the feature location information including the generated location information. Accordingly, the location information storage unit 160 stores the feature location information including the generated location information in order of generation of the location information.

The point feature has location information represented by a three-dimensional position of the point. The centroid feature has location information represented by a three-dimensional position of the centroid. The line feature has location information represented by three-dimensional positions of two endpoints of the line segment. The marker 100D has location information represented by three-dimensional positions of four vertices of the mark 100D.

The feature location information includes a registration number indicating a registration order, a type number, and a three-dimensional position indicating the location information. FIG. 21 illustrates a feature location information group stored in the location information storage unit 160.

FIG. 21 illustrates an example table of various pieces of feature location information stored in the location information storage unit 160. The location information storage unit 160 can store the feature location information in any format. Both a selected state parameter and an enabling state parameter are associated with individual feature location information.

In FIG. 21, registration number indicates registration order of the feature location information. The earlier the feature location information is registered, the lower registration number is assigned. However, a same registration number is allocated to the feature location information of the same geometric feature. For example, according to the example illustrated in FIG. 21, the same registration number (1) is allocated to three-dimensional positions of four corners defining the marker 100D.

The type number is a number identifying a relationship between feature location information and a geometric feature. For example, type number 1 is allocated to the feature location information of the point feature. Type number 2 is allocated to the feature location information of the line feature. Type number 3 is allocated to the feature location information of the centroid feature. Type number 4 is allocated to the feature location information of the marker 100D.

Although the above-described exemplary embodiment uses four types of geometric features (point feature, centroid feature, line feature, marker), another exemplary embodiment may not use all of the four types of geometric features.

The three-dimensional position is location information stored beforehand or location information of an unknown geometric feature. Four groups of three-dimensional positions, in the first to fourth rows of the table illustrated in FIG. 21, correspond to known position information of the marker 100D and registered beforehand by a user.

The selected state parameter holds a value indicating whether the feature location information (or the location information) is selected by a user's operation. As described above, the selected state parameter is allocated to individual feature location information. For example, when the feature location information is selected by the user's operation, the selected state parameter corresponding to the selected feature location information holds a value "1." On the other hand, if the feature location information is not selected by the user's operation, the selected state parameter corresponding to the selected feature location information holds a value "0." In this manner, a user can determine whether the feature location information is selected by the user's operation by referring to the value of the corresponding selected state parameter.

The enabling state parameter holds a value indicating whether the feature location information (or location information) is enabled by the user's operation. As described above, the enabling state parameter is allocated to individual feature location information. For example, when the feature location information is enabled by the user's operation, the enabling state parameter corresponding to the selected feature location information holds a value "1." On the other hand, if the feature location information is not enabled by the user's operation, the enabling state parameter corresponding to the selected feature location information holds a value "0." In this manner, the user can determine whether the feature location information is enabled or disabled by the user's operation by referring to the value of the corresponding enabling state parameter.

In the following description, the enabled feature location information is referred to as "effective feature location information." If the location information storage unit 160 receives a request from an external device, the location information storage unit 160 can transmit stored information to the external device. Therefore, application software installed on the external device can use the received location information of a geometric feature to measure the position/orientation of the camera 110.

Next, the imaging unit position/orientation estimation unit 185 reads the location information in the feature location information corresponding to the enabling state parameter indicating an enabled state (having a parameter value "1"), among the feature location information stored in the location information storage unit 160. Then, the imaging unit position/orientation estimation unit 185 obtains (estimates) the position/orientation of the camera 110 in the present frame based on the readout location information and image coordinates obtained by the image feature detection unit 130.

More specifically, the position/orientation of the camera 110 estimated for a preceding frame is used as initial values. Then, the imaging unit position/orientation estimation unit 185 calculates the position/orientation of the camera 110 by repetitively performing non-linear optimization so as to minimize a difference between a projected position (image coordinates) of the coordinate values indicated by the readout location information on the imaging plane of the camera 110 and image coordinates obtained by the image feature detection unit 130. The calculated position/orientation represent the position/orientation of the camera 110 in the present frame.

The image storage unit 150 temporarily stores captured images received from the camera 110 via the image input unit 120. As described below, when the feature location information is edited, it is difficult to designate specific location information on a moving image. Therefore, the image storage unit 150 stores still images constituting the moving image, so that editing processing can be performed on each still image. Thus, an online image (a captured image entered from the image input unit 120) or a stored image (a captured image stored in the image storage unit 150) can be selectively output to the HMD 115 according to a status. The operation input unit 170 transmits an instruction signal entered from the operation input device 117 to the imaging unit position/orientation estimation unit 185 or the location information editing unit 180.

The location information editing unit 180 includes a function of editing the feature location information stored in the location information storage unit 160. For example, the editing performed on the feature location information includes "selection", "disabling", and "enabling." An example editing work is described below in detail.

A combining unit 195 generates a composite image by projecting (superimposing) the location information of the feature location information stored in the location information storage unit 160 on the captured image acquired from the image storage unit 150.

Figure 5:
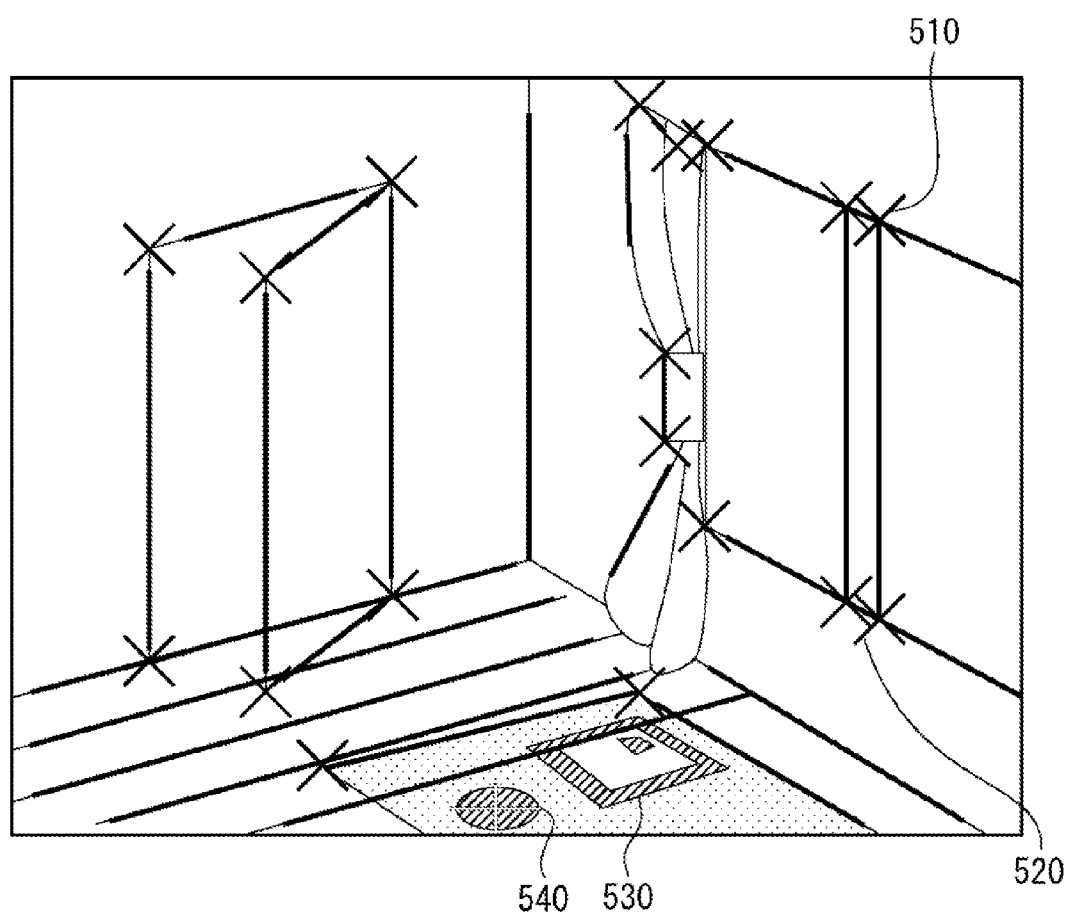
FIG. 5 illustrates an example composite image.

For example, if the camera 110 captures an image illustrated in FIG. 4 and feature location information of peripheral image features is already registered, the combining unit 195 generates an image illustrated in FIG. 5, which is displayed on the HMD 115. FIG. 5 illustrates an example composite image generated by the combining unit 195.

As illustrated in FIG. 5, "x" marks 510 and 520 represent the point features which are projected on the captured image at positions corresponding to three-dimensional positions stored as the location information. A white cross mark 540 represents the centroid feature. A straight line connecting two endpoints can be projected on the captured image with reference to the location information of the line feature that includes two endpoints. A broken line 530 connecting four vertices is projected on the image to represent the marker.

As described above, instead of directly displaying the three-dimensional position of the geometric feature at a same position projected on the captured image, the present exemplary embodiment displays an object having a shape corresponding to the type of each geometric feature (hereinafter, referred to as "location information display object"). Thus, the present exemplary embodiment can improve visibility and operability of the location information. The method for displaying the geometric feature on the captured image is not limited to the example illustrated in FIG. 5. More specifically, any other display method is usable if the location of the geometric feature in the physical space can be confirmed on the captured image and the type of each geometric feature is discriminable in the captured image.

Figure 6:
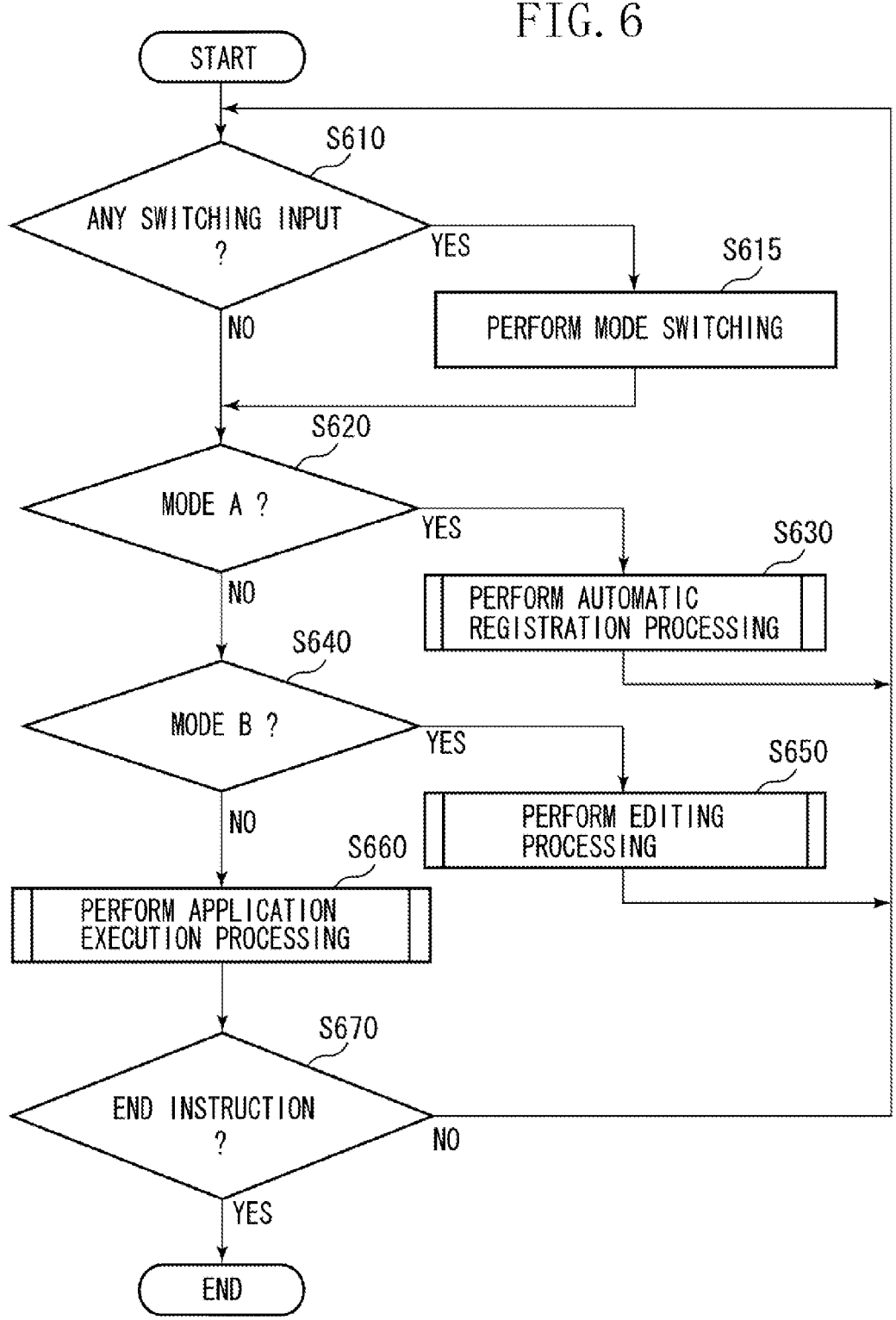
FIG. 6 is a flowchart illustrating example processing for notifying a user of a geometric feature on a captured image.

FIG. 6 is a flowchart illustrating main processing performed by the image processing apparatus according to the present exemplary embodiment, for displaying notification to a user about the geometric feature on the captured image. In step S610, the operation input unit 170 checks the presence of any input entered via the operation input device 117. If the operation input unit 170 determines that an input is present (YES in step S610), the processing proceeds to step S615. If the operation input unit 170 determines that there is no input (NO in step S610), the processing proceeds to step S620.

If the user 105 who holds the operation input device 117 wants to select a different processing mode, the user 105 can designate a corresponding button on the operation input device 117. If any button is designated, a signal unique to the designated button is input to the operation input unit 170. In this case, the processing proceeds to step S615 via step S610.

In step S615, the operation input unit 170 identifies the designated button in response to the input signal. Thus, the operation input unit 170 can specify the processing mode corresponding to the designated button. There are various methods for specifying the processing mode. Any method is usable.

The imaging unit position/orientation estimation unit 185 changes the processing mode presently set in the image processing apparatus 199 to the processing mode specified by the operation input unit 170. If the presently set processing mode is identical to the specified processing mode, the imaging unit position/orientation estimation unit 185 does not change the processing mode.

In the present exemplary embodiment, the user 105 can select and designate an automatic registration processing mode (mode A), an editing processing mode (mode B), or an application execution mode (mode C) via the operation input device 117. Therefore, the image processing apparatus 199 is operable in one of the above-described three processing modes according to selection and designation of the user 105. The image processing apparatus 199 can start its operation with the automatic registration processing mode.

In step S620, it is determined whether the processing mode currently set in the image processing apparatus 199 is the mode A. If the current processing mode is the mode A (YES in step S620), the processing proceeds to step S630. If the current processing mode is not the mode A (NO in step S620), the processing proceeds to step S640.

In step S630, the image processing apparatus 199 performs automatic registration processing, as described below.

In step S640, it is determined whether the processing mode currently set in the image processing apparatus 199 is the mode B. If the current processing mode is the mode B (YES in step S640), the processing proceeds to step S650. If the current processing mode is not the mode B (NO in step S640), the processing proceeds to step S660. In step S650, the image processing apparatus 199 performs editing processing, as described below.

In step S660, the image processing apparatus 199 performs application execution processing, as described below. In step S670, the operation input unit 170 determines whether an end button for inputting an instruction to end processing (one of the buttons provided on the operation input device 117) is designated by the user 105. If the operation input unit 170 determines that the end button is designated (YES in step S670), the image processing apparatus 199 terminates the processing. When the image processing apparatus 199 terminates the processing, the image processing apparatus 199 can transmit the location information of the geometric features stored in the location information storage unit 160 to an external device as necessary. If the operation input unit 170 determines that the end button is not designated (NO in step S670), the processing returns to step S610 to repeat the above-described processing.

Figure 7:
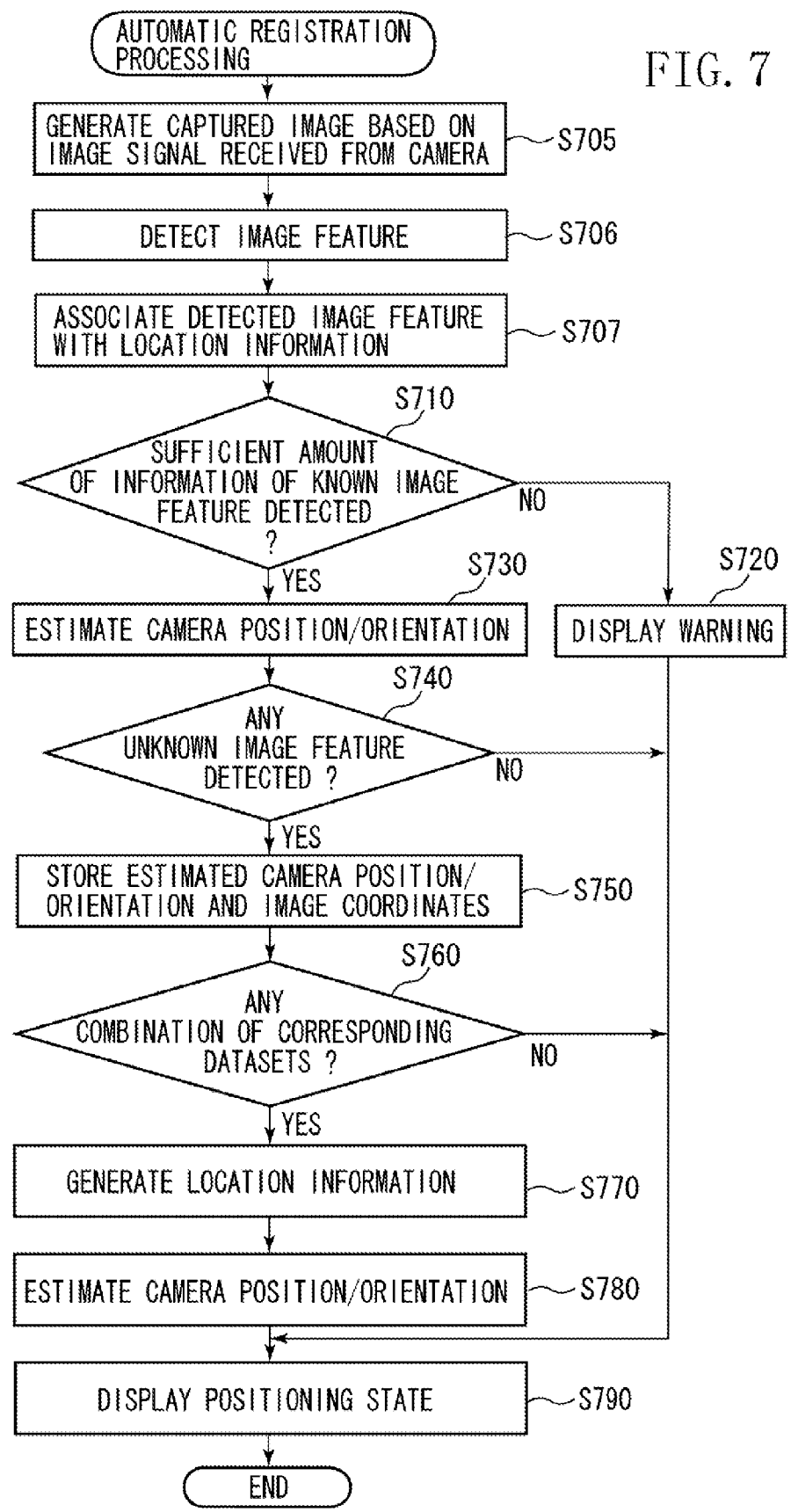
FIG. 7 is a flowchart illustrating detailed processing performed when an automatic registration processing mode is set.

FIG. 7 is a flowchart illustrating detailed processing performed in step S630 when the automatic registration processing mode is set.

In step S705, the image input unit 120 generates a captured image based on an image signal received from the camera 110. A conventionally known technique is usable to generate an image based on an image signal. In step S706, the image feature detection unit 130 detects an image feature as a projection image of a geometric feature based on the captured image generated in step S705. The image feature detection unit 130 acquires image coordinates of the image feature detected from the captured image. In step S707, the location information generation unit 140 associates the image coordinates acquired in step S706 with "effective feature location information" stored in the location information storage unit 160.

The association processing is performed in the following manner. First, the location information generation unit 140 projects location information in respective "effective feature location information" stored in the location information storage unit 160 on an imaging plane of the camera 110 using the position/orientation of the camera 110 in a preceding frame. The coordinate position on the imaging plane where the location information is projected, is referred to as "projection coordinate position."

Among the feature location information similar in type to the image feature detected in step S706, the location information generation unit 140 associates the image coordinates of the image feature with the feature location information including the location information projected to a projection coordinate position which is closest to the image coordinates of the image feature.

More specifically, Among the feature location information similar in type to the image feature detected in step S706, the location information generation unit 140 identifies the feature location information including the location information projected to a projection coordinate position Y which is closest to the image coordinates X of the image feature. Then, the location information generation unit 140 associates the identified location information with the image coordinates. Alternatively, instead of directly performing the above-described association processing, the location information generation unit 140 can perform the following processing.

More specifically, the location information generation unit 140 determines whether a distance between the image coordinates X and the projection coordinate position Y is less than or equal to a predetermined distance. If the distance is within the predetermined distance, the location information generation unit 140 performs the above-described association processing. If the distance is greater than the predetermined distance, the location information generation unit 140 does not perform the above-described association processing.

In step S710, the location information generation unit 140 determines whether a number of the image features having the image coordinates associated with the feature location information in step S707 is sufficient to estimate the position/orientation of the camera 110. For example, the number of image features sufficient to estimate the position/orientation of the camera 110 is equivalent to one or more square markers, two or more line features, three or more point features, or three or more centroid features when the position/orientation of the camera 110 is obtained in the preceding frame.

If the centroid feature can be regarded as one of the point features, the required number of points is three or more. However, the present exemplary embodiment does not limit a combination of image features. For example, an image feature having an identification code in a marker having a circular outer shape is usable to estimate the position/orientation of the camera 110.

The present exemplary embodiment does not require a sufficient number of image features (e.g., one or more square markers) to be associated. Any image feature capable of estimating the position/orientation of the camera 110 can be associated with the feature location information. Determining whether the position/orientation of the camera 110 is measured in the preceding frame can be performed by referring to the unestimatable state parameter stored in the location information generation unit 140. If the unestimatable state parameter is '1', it indicates that the position/orientation of the camera 110 was not measured in the preceding frame.

If the sufficient number of image features are not obtained from the captured image (NO in step S710), the next processing in step S730 (estimation of position/orientation of the camera 110) cannot be accurately performed. Accordingly, any dataset suitable for obtaining feature location information is not acquired. Therefore, the processing proceeds to step S720. On the other hand, if the sufficient number of image features are obtained from the captured image (YES in step S710), the processing proceeds to step S730.

In step S720, the location information generation unit 140 transmits a warning message to the HMD 115 to notify the user 105 of difficulty in estimating the position/orientation of the camera 110 based on the detected image features. The warning message can be prepared beforehand and stored in a memory of the image processing apparatus 199, or can be appropriately generated by the location information generation unit 140. Instead of using the message, an appropriate warning icon can be displayed. Instead of displaying the message or icon, there are various warning methods using, for example, sounds or voices.

The location information generation unit 140 writes "1" (indicating difficulty in estimating the position/orientation of the camera 110) to the unestimatable state parameter stored therein. In step S730, the imaging unit position/orientation estimation unit 185 estimates the position and orientation of the camera 110 based on the image coordinates and the location information which are associated in step S707. Such processing is performed by a conventionally known technique. Then, the location information generation unit 140 writes "0" (indicating success in estimating the position/orientation of the camera 110) to the unestimatable state parameter.

In step S740, the location information generation unit 140 searches for an unknown image feature which was not associated with the location information in step S707 among the image features detected in step S706. If there is an unknown image feature (YES in step S740), the processing proceeds to step S750. If there is not any unknown image feature (NO in step S740), the processing proceeds to step S790.

In step S750, the location information generation unit 140 generates a dataset including the position/orientation of the camera 110 estimated in step S730 and image coordinates of the unknown image feature detected in step S740. The location information generation unit 140 stores the dataset in a memory of the location information generation unit 140 or a memory of the image processing apparatus 199.

In step S760, the location information generation unit 140 refers to the camera position in the dataset stored in step S750 and the camera position in the dataset stored in the location information generation unit 140. Then, the location information generation unit 140 determines whether there are datasets X and Y that satisfy a relationship that a distance between the camera position in the dataset X and the camera position in the dataset Y is equal to or greater than a threshold. If the datasets X and Y are present (YES in step S760), the processing proceeds to step S770. If the datasets X and Y are not present (NO in step S760), the processing proceeds to step S790.

In step S770, the location information generation unit 140 identifies a combination of two datasets that minimize the distance between the camera positions among one or more combinations each including two datasets corresponding to the datasets X and Y. Various methods are available to select one of combinations each including two datasets corresponding to the datasets X and Y. Any method is usable to select a combination that can accurately generate the feature location information.

Next, the location information generation unit 140 generates the feature location information corresponding to the unknown image feature by performing the above-described processing based on two datasets of the identified combination. The location information generation unit 140 stores the generated feature location information in the location information storage unit 160. In this case, the location information generation unit 140 sets "1" to the enabling state parameter corresponding to the newly generated feature location information, to enable the location information in the feature location information. Such enabling processing may be skipped if unnecessary. If the location information is initially disabled, the enabling processing can be performed later through selection processing.

As described above, the location information generation unit 140 associates the image coordinates of the image feature in the present frame with the newly generated feature location information. Through the above-described processing, if there is any image feature that cannot be associated with the registered location information, the location information generation unit 140 can obtain and register the location information of the image feature. Then, the location information generation unit 140 can associate the image coordinates of the image feature with the registered location information.

In step S780, the imaging unit position/orientation estimation unit 185 again obtains the position and orientation of the camera 110 based on the "effective feature location information" stored in the location information storage unit 160 which includes the feature location information registered in step S770.

In step S790, the imaging unit position/orientation estimation unit 185 performs the following processing. The imaging unit position/orientation estimation unit 185 projects all (or effective) location information of the feature location information stored in the location information storage unit 160 on the imaging plane (on the captured image) of the camera 110, using the position and orientation obtained from the present frame (e.g., the position and orientation obtained in step S780). Thus, the position on the imaging plane where the location information is projected is obtainable as the projection coordinate position. Further, the combining unit 195 generates a composite image (updated captured image) including a synthetic display combined with the captured image at the projection coordinate position. The combining unit 195 transmits the generated composite image to the HMD 115.

Furthermore, the combining unit 195 can display any data other than the projection image of the location information, as information displayed on the captured image to indicate accuracy in estimating the position/orientation of the camera 110. For example, a lattice-type wire frame can be displayed on respective planes of x=0, y=0, and z=0. An arbitrary virtual object can be displayed at a specific position to let the user 105 confirm estimated position/orientation of the camera 110. The combining unit 195 can display any numerical value on the captured image to indicate the estimated position/orientation of the camera 110 and the distance between the image feature and the location information on the captured image.

In this manner, by estimating the position/orientation of the camera 110 including generated information, position/orientation estimation can be performed in a wide range. Further, as described above, immediately displaying a positioning status enables the user 105 to promptly select the mode B, if location information having a large error is registered, and edit the location information.

Figure 8:
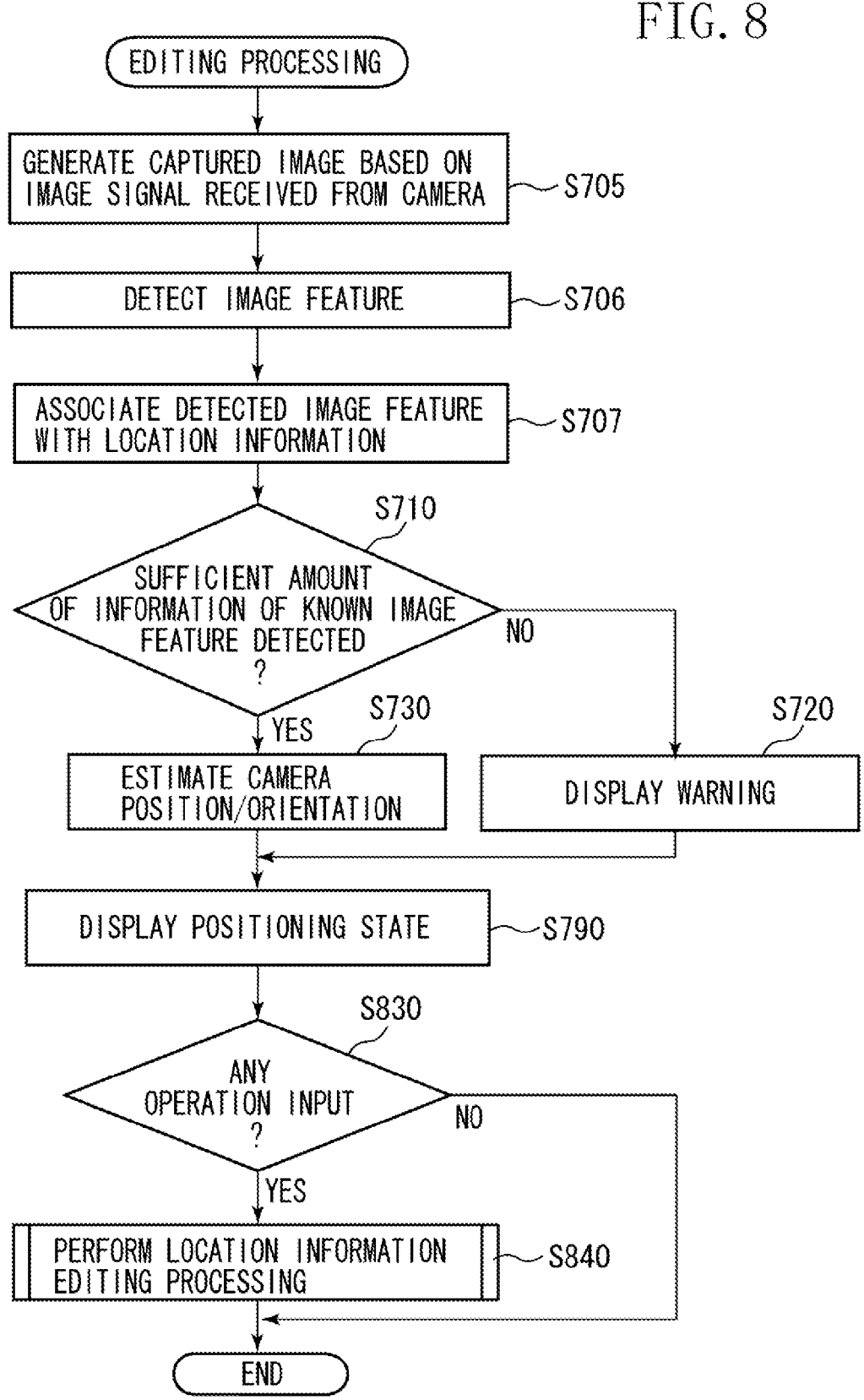
FIG. 8 is a flowchart illustrating detailed processing performed when an editing processing mode is set.

FIG. 8 is a flowchart illustrating detailed processing performed in step S650, when the editing processing mode is set. In FIG. 8, steps similar to those illustrated in FIG. 7 are denoted by similar step numbers and description thereof is not repeated.

In step S830, the operation input unit 170 determines whether any instruction input is entered via the operation input device 117. If the operation input unit 170 confirms the presence of any instruction input (YES in step S830), the processing proceeds to step S840. On the other hand, if there is no instruction input (NO in step S830), the processing returns to step S610. In step S840, the location information editing unit 180 performs editing processing on the feature location information. Detailed processing performed in step S840 is described below.

As described above, selected location information can be reflected to the estimation processing of the position/orientation of the camera 110 in a subsequent frame. The display processing performed in step S790 enables the user 105 to immediately confirm a visualized image of the selected location information. Therefore, the user 105 can check how the selected location information contributes to the estimation processing of the position/orientation of the camera 110.

For example, it is assumed that processing includes disabling location information not contributing to the estimation processing of the position/orientation of the camera 110, i.e., location information having a lower accuracy (large error) in geometric feature estimation. If the location information is disabled, a projected virtual object approaches a correct position in step S790 for the subsequent frame. Thus, the user 105 can have feedback such as "the estimation accuracy is improved."

It can be also assumed that the processing includes disabling location information having a higher contribution, namely location information corresponding to an image feature having a higher accuracy in the geometric feature estimation and having a higher dispersion on the screen. If the location information is disabled, the projected virtual object departs from a correct position in step S790 and the projection position fluctuates. Thus, the user 105 can have feedback such as "the estimation accuracy is lessened."

In this manner, when the user 105 enables the location information having the higher contribution and disables unnecessary location information having the lower contribution, a required minimum amount of the location information can be obtained on each site where the estimation processing of the position/orientation of the camera 110 is performed. When the required minimum amount of location information is obtained, possibility of generating an identification error can be reduced and processing speed can be maintained appropriately.

Figure 9:
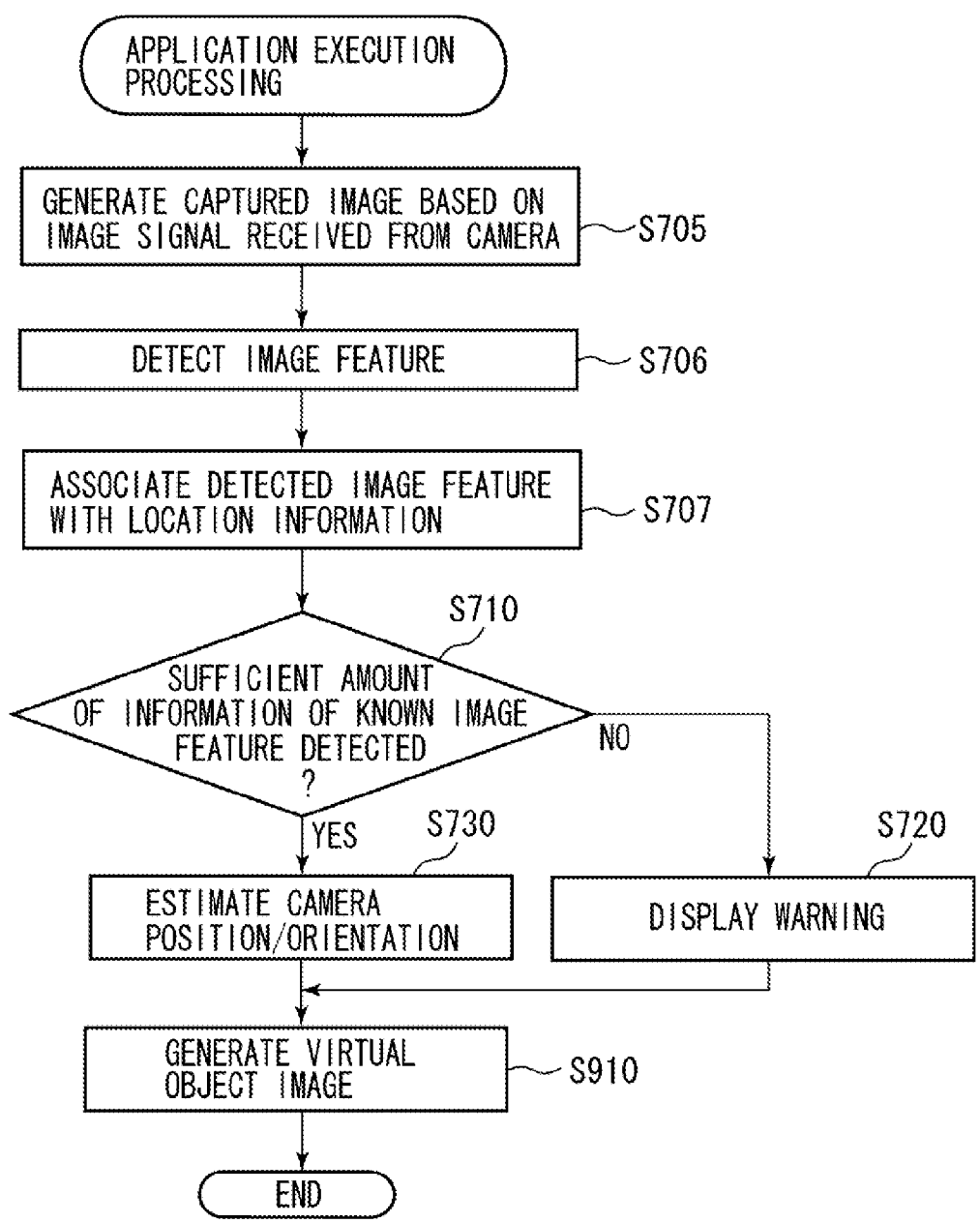
FIG. 9 is a flowchart illustrating detailed processing performed when an application execution mode is set.

FIG. 9 is a flowchart illustrating detailed processing performed in step S660, when the application execution mode is set. In FIG. 9, steps similar to those illustrated in FIG. 7 are denoted by similar step numbers and description thereof is not repeated.

In step S910, the image processing apparatus 199 generates an image of a virtual space where a prepared virtual object is located with reference to the position/orientation of the camera 110 estimated in step S730. The virtual object enables the user 105 to confirm whether position/orientation measurement based on the obtained location information was successful, and can be prepared beforehand. For example, a lattice-type wire frame can be displayed on respective planes of x=0, y=0, and z=0. A teapot image, as a virtual object, can be displayed at a specific position. Further, the image processing apparatus 199 can incorporate an application (mode C) realizing a mixed reality that require the position/orientation of the camera 110. For example, a specific character can be displayed to let the user 105 enjoy interacting with the content of the character.

However, the mode C purports to simply generate the feature location information to obtain the position/orientation of the camera 110, and does not depend on the content of the mixed reality executed in the application execution processing.

Figure 10:
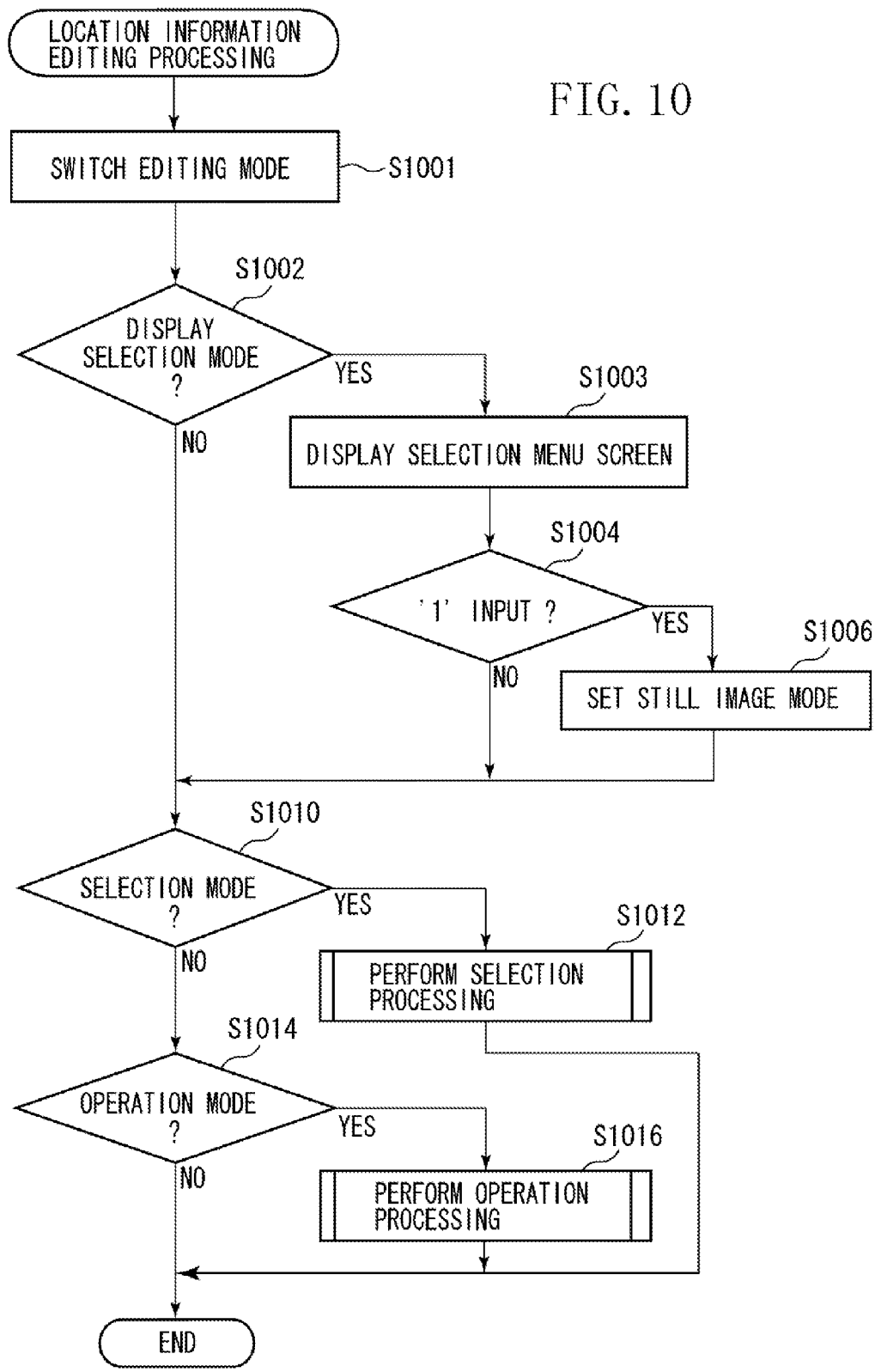
FIG. 10 is a flowchart illustrating detailed location information editing processing.

FIG. 10 is a flowchart illustrating detailed location information editing processing which is performed in step S840.

In step S1001, the operation input unit 170 receives an editing mode switching input from the operation input device 117. The location information editing unit 180 stores the received editing mode as an internal state parameter. The user 105 can set any one of a "display selection mode", a "selection mode", and an "operation mode", via the operation input device 117.

If the user 105 who holds the operation input device 117 wants to select a different editing mode, the user 105 can designate a corresponding button on the operation input device 117. If any button is designated, a signal unique to the designated button is input to the operation input unit 170. In this case, the processing proceeds to step S1002.

In step S1002, the operation input unit 170 identifies the designated button in response to the input signal. Thus, the operation input unit 170 can specify the editing mode corresponding to the designated button. There are various methods for specifying the editing mode. Any method is usable.

The imaging unit position/orientation estimation unit 185 changes the editing mode presently set in the image processing apparatus 199 to the editing mode specified by the operation input unit 170. If the presently set editing mode is identical to the specified editing mode, the imaging unit position/orientation estimation unit 185 does not change the editing mode.

If the operation input unit 170 determines that the "display selection mode" is specified (YES in step S1002), the processing proceeds to step S1003. If the "display selection mode" is not specified (NO in step S1002), the processing proceeds to step S1010.

Figure 15:
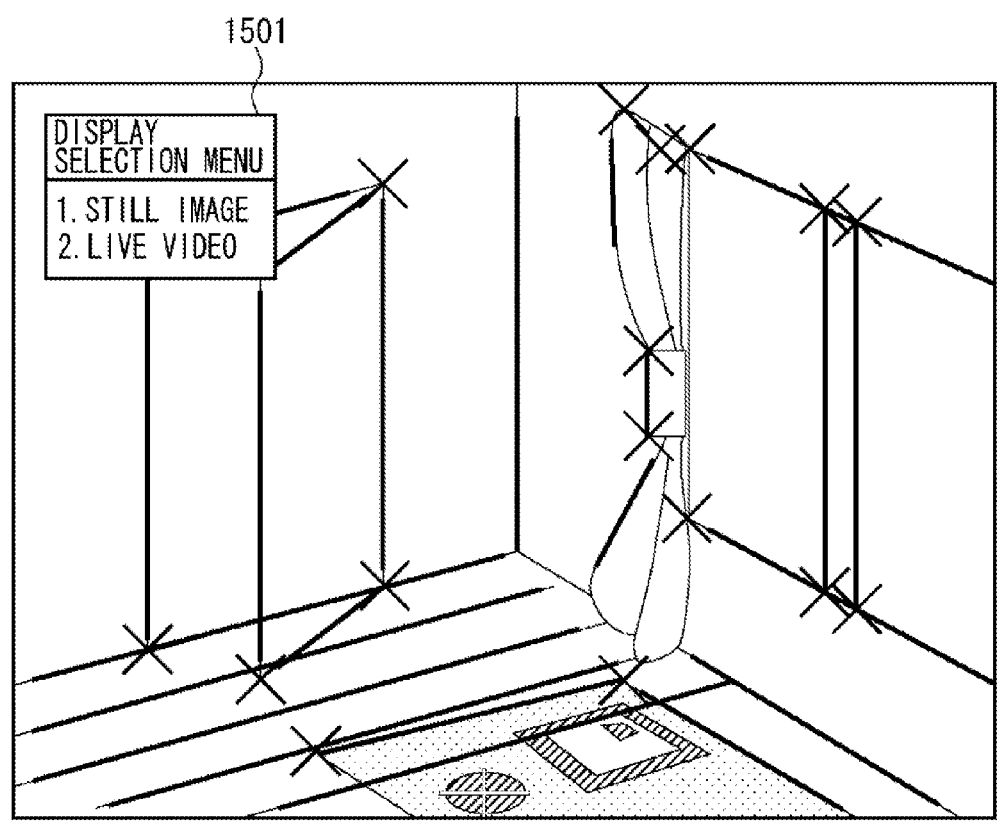
FIGS. 15 to 19 illustrate example screen images displayed on a screen in a head-mounted display (HMD).

In step S1003, the location information editing unit 180 causes the HMD 115 to display a screen image illustrated in FIG. 15 on its display screen. FIG. 15 illustrates an example screen image displayed by the HMD 115 on its display screen in step S1003. In FIG. 15, a menu 1501 enables the user 105 to select whether to reproduce images of each frame captured by the camera 110 as a moving image (live video) or as a captured image (still image) of each frame. Configuration of the menu 1501 is not limited. When the menu 1501 is displayed on the HMD 115, the user 105 can select "still image" by designating a '1' key on the operation input device 117, or can select "live video" by designating a '2' key.

Accordingly, in step S1004, if the '1' key is designated (YES in step S1004), the processing proceeds to step S1006. If the '1' key is not designated (NO in step S1004), the processing proceeds to step S1010.

In step S1006, the location information editing unit 180 reads a latest captured image from the image storage unit 150 and transmits the readout captured image to the image feature detection unit 130 and the HMD 115. Such a control mode is referred to as a "still image mode." Outputting a still image enables the user 105 to designate or select a specific moving point (or line) on an online moving image. Further, displaying the present still image together with past still image(s) enables the user 105 to select the location information by successively referring to a plurality of still images. Selection from the plurality of still images is effective to facilitate detecting the space when the location information is selected. If the "still image mode" is not selected, the captured images of each frame successively input from the camera 110 via the image input unit 120 are sent to the image feature detection unit 130 and the HMD 115.

In step S1010, the operation input unit 170 determines which button is designated by the signal received from the operation input device 117. If the operation input unit 170 determines that the "selection mode" is designated (YES in step S1010), the processing proceeds to step S1012. If the "selection mode" is not designated (NO in step S1010), the processing proceeds to step S1014.

In step S1012, the location information editing unit 180 performs selection processing of the location information. Detailed processing performed in step S1012 is described below. In step S1014, the operation input unit 170 determines which button is designated by the signal received from the operation input device 117. If the operation input unit 170 determines that the "operation mode" is designated (YES in step S1014), the processing proceeds to step S1016. If the "operation mode" is not designated (NO in step S1014), the processing returns to step S610. In step S1016, the location information editing unit 180 performs operation processing of the location information. Detailed processing performed in step S1016 is described below.

Figure 11:
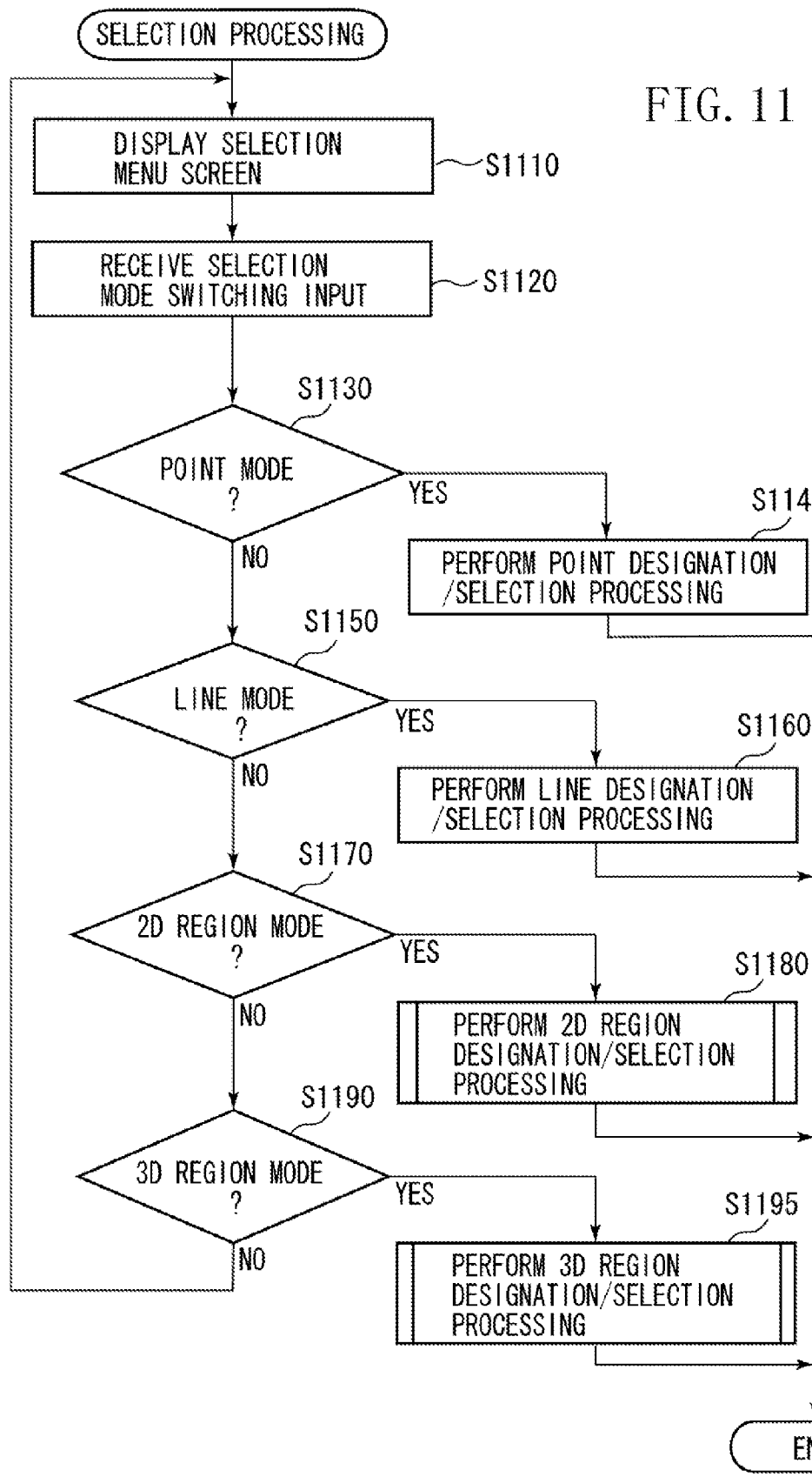
FIG. 11 is a flowchart illustrating detailed location information selection processing.

FIG. 11 is a flowchart illustrating detailed selection processing of the location information performed in step S1012.

Figure 16:
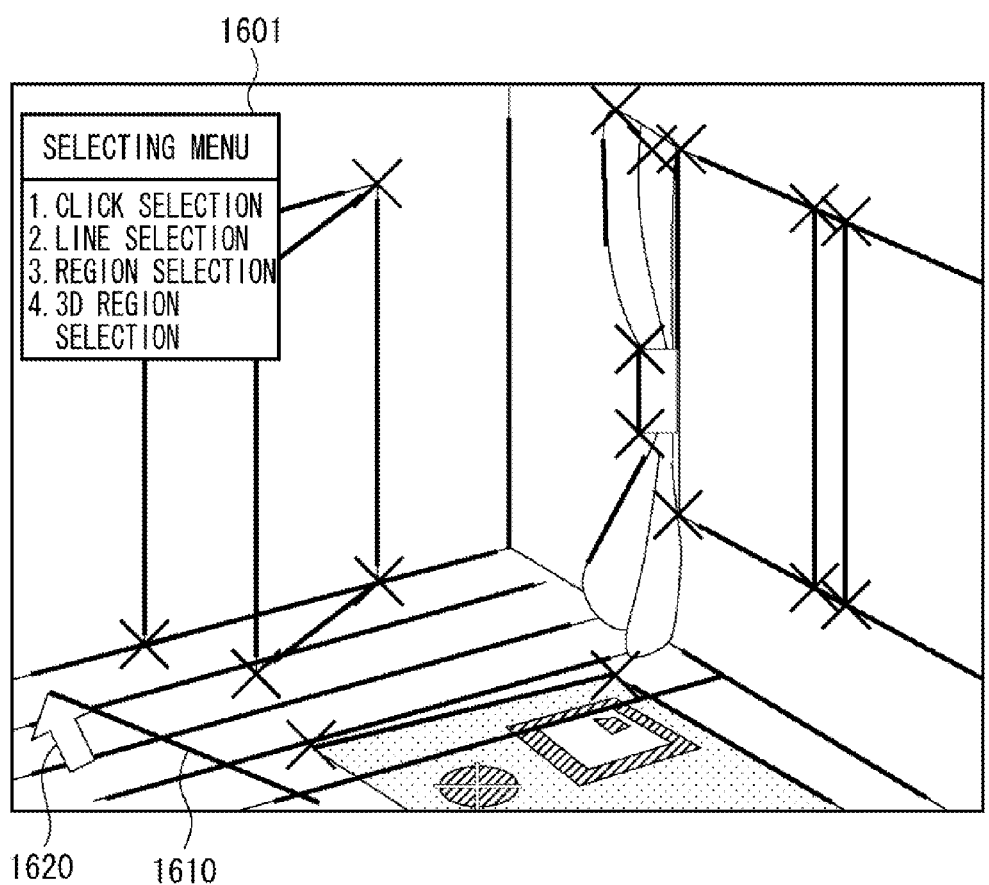

In step S1110, the location information editing unit 180 causes the HMD 115 to display a screen image illustrated in FIG. 16 on its display screen. FIG. 16 illustrates an example screen image displayed by the HMD 115 on its display screen in step S1110. In FIG. 16, a menu 1601 enables the user 105 to designate a selection method. When the menu 1601 is displayed, the user 105 can select "click selection" to set a "point mode" by designating the '1' key on the operation input device 117. The user 105 can select "line selection" to set a "line mode" by designating the '2' key. The user 105 can select "region selection" to set a "2D region mode" by designating a '3' key. Moreover, the user 105 can select "3D region selection" to set a "3D region mode" by designating a '4' key.

In step S1120, the operation input unit 170 receives an input (selection mode switching input) from the operation input device 117. In step S1130, the operation input unit 170 determines which button is designated according to a signal received from the operation input device 117. If the operation input unit 170 determines that the "point mode" is designated (YES in step S1130), the processing proceeds to step S1140. If the "point mode" is not designated (NO in step S1130), the processing proceeds to step S1150.

In step S1140, the location information editing unit 180 causes the HMD 115 to display a mouse cursor 1620 on the screen image illustrated in FIG. 16. It is now assumed that the user 105 moves the mouse cursor 1620 and clicks on the position indicating the location information display object with the operation input device 117. The location information editing unit 180 detects these operations. In this case, the location information editing unit 180 sets a selected state parameter of the location information corresponding to the location information display object stored in the location information storage unit 160 to "1."

If the user 105 moves the mouse cursor 1620 and clicks on other location information display object, the location information editing unit 180 sets the currently set selected state parameter "1" to "0" and sets the selected state parameter corresponding to the "other location information display object" to "1." In this manner, regardless of a selection method, the location information editing unit 180 sets the selected state parameter of selected location information to "1" and the selected state parameter of non-selected location information to "0."

Further, if the user 105 performs a click operation on the location information display object while pressing a shift key provided on the operation input device 117, the selected location information display object can be added to a previously selected location information display object. According to the selected state, a color or a shape of a location information projection image displayed on the HMD 115 can be changed.

In step S1150, the operation input unit 170 determines which button is designated according to the signal received from the operation input device 117. If the operation input unit 170 determines that the "line mode" is designated (YES in step S1150), the processing proceeds to step S1160. If the "line mode" is not designated (NO in step S1150), the processing proceeds to step S1170.

In step S1160, the location information editing unit 180 causes the HMD 115 to display the mouse cursor 1620 on the screen image illustrated in FIG. 16. It is now assumed that the user 105 drags and moves the mouse cursor 1620 with the operation input device 117. The location information editing unit 180 detects these operations. In this case, the location information editing unit 180 causes the HMD 115 to display a moving locus 1610 of the dragged and moved mouse cursor 1620. If the moving locus 1610 overlaps with the location information display object, the location information editing unit 180 determines that corresponding location information is selected by the user 105 and sets the selected state parameter of the selected location information stored in the location information storage unit 160 to "1."

If the moving locus 1610 is overlapped with a plurality of location information display objects, the location information editing unit 180 determines that all of the location information corresponding to the overlapped location information display objects is selected by the user 105. If there is a plurality of the moving loci 1610, the above-described selection processing can be performed using the plurality of moving loci 1610.

As described above, by selecting the location information with the moving locus 1610 of the mouse cursor 1620 on the captured image, the location information concentrated in a small region can be selected simultaneously. For example, if the location information is registered for a floor pattern that may cause an identification error, the user 105 can select the location information display objects representing the line features of a floor surface by dragging and moving the mouse cursor 1620 across the location information display objects.

In step S1170, the operation input unit 170 determines which button is designated according to the signal received from the operation input device 117. If the operation input unit 170 determines that the "2D region mode" is designated (YES in step S1170), the processing proceeds to step S1180. If the "2D region mode" is not designated (NO in step S1170), the processing proceeds to step S1190.

In step S1180, the location information editing unit 180 performs 2D region selection/designation processing. Detailed processing performed in step S1180 is described below.

In step S1190, the operation input unit 170 determines which button is designated according to the signal received from the operation input device 117. If the operation input unit 170 determines that the "3D region mode" is designated (YES in step S1190), the processing proceeds to step S1195. If the "3D region mode" is not designated (NO in step S1190), the processing returns to step S1110.

In step S1195, the location information editing unit 180 performs 3D region selection/designation processing. Detailed processing performed in step S1195 is described below.

Figure 12:
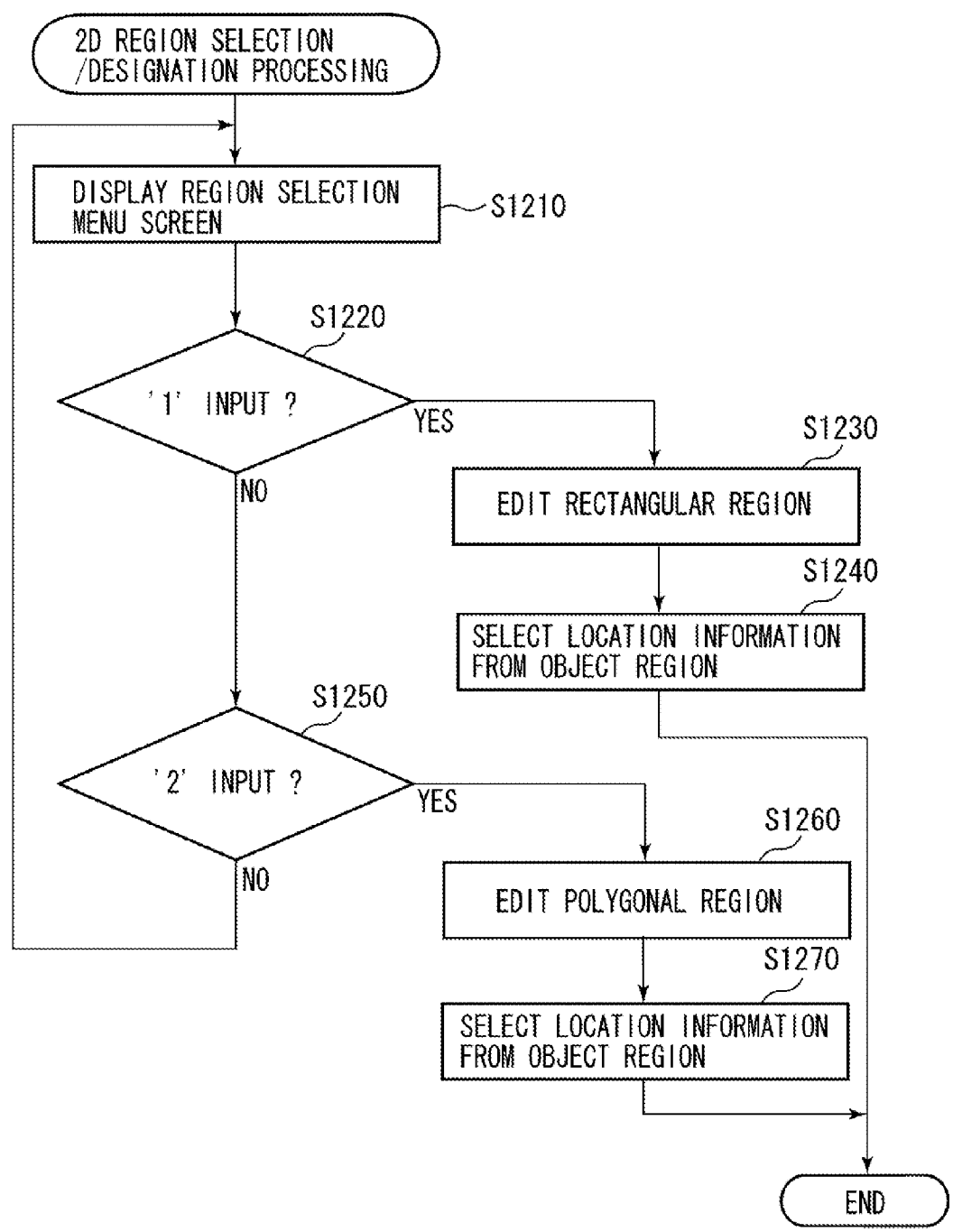
FIG. 12 is a flowchart illustrating two-dimensional (2D) region selection/designation processing.

FIG. 12 is a flowchart illustrating example processing performed in step S1180 to select and designate a 2D region.

Figure 17:
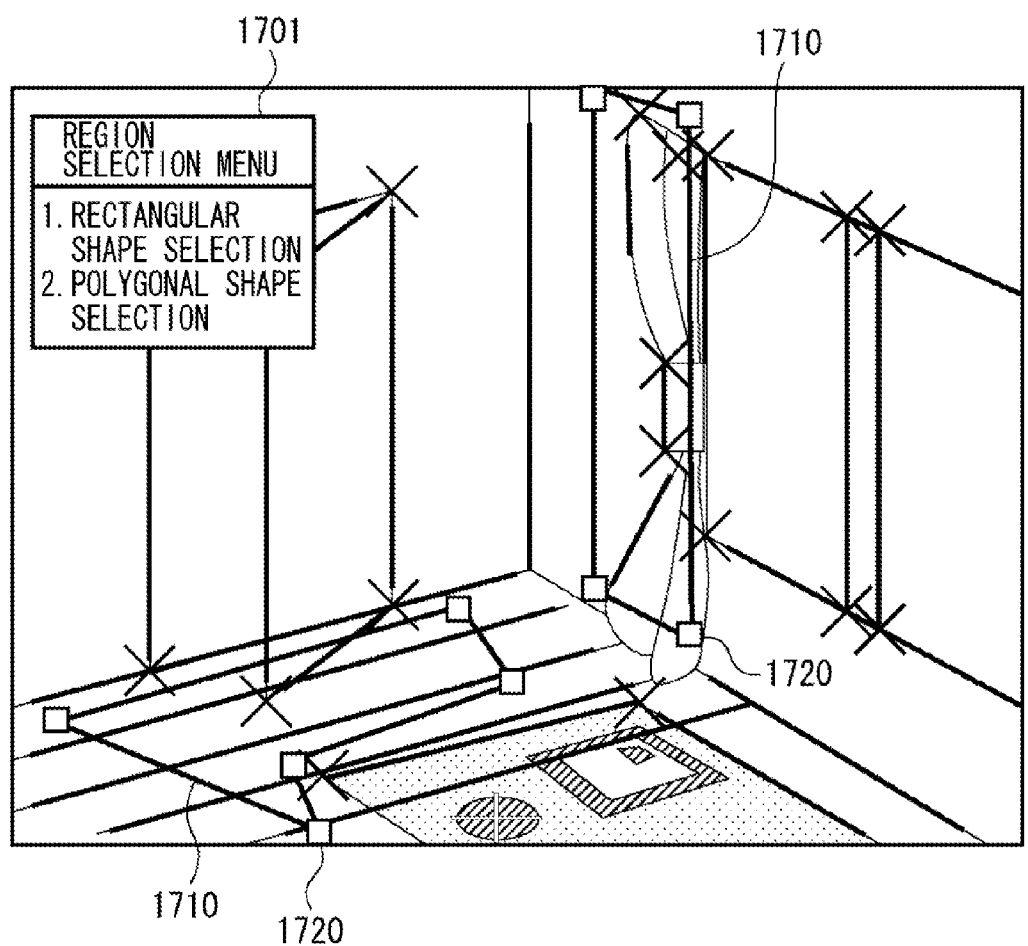

In step S1210, the location information editing unit 180 causes the HMD 115 to display a screen image illustrated in FIG. 17 on its display screen. FIG. 17 illustrates an example screen image displayed by the HMD 115 on its display screen in step S1210. In FIG. 17, a menu 1701 enables the user 105 to designate a selection method. When the menu 1701 is displayed, the user 105 can select "rectangular shape selection" by designating the '1' key on the operation input device 117. The user 105 can select "polygonal shape selection" by designating the '2' key. Accordingly, in step S1220, if the '1' key is designated (YES in step S1220), the processing proceeds to step S1230. On the other hand, if the '1' key is not designated (NO in step S1220), the processing proceeds to step S1250.

In step S1230, the location information editing unit 180 displays a rectangular region display object on the display screen of the HMD 115. If the user 105 moves the position of the entire region display object or the position of a vertex defining the region display object with the operation input device 117, the location information editing unit 180 detects such operations and moves the position of the region display object or the position of the vertex according to the content of the operations.

In step S1240, the location information editing unit 180 selects location information corresponding to a location information display object positioned in an internal area of the region display object whose position and shape are determined by the operation in step S1230. The processing for determining whether the location information display object is inside or outside of the region indicated by the region display object can be performed on the captured image.

In step S1250, if the '2' key is designated (YES in step S1250), the processing proceeds to step S1260. On the other hand, the '2' key is not designated (NO in step S1250), the processing returns to step S1210.

In step S1260, the location information editing unit 180 displays a polygonal region display object on the display screen of the HMD 115.

To display the polygonal region display object, the user 105 performs a preparatory operation. More specifically, the user 105 designates a plurality of vertex positions on the captured image with the operation input device 117. Then, the user 105 instructs termination of the operation for designating the vertex positions with the operation input device 117. The location information editing unit 180 draws (generates) a polygonal shape connecting designated vertex positions on the captured image. The generated polygonal shape becomes a region display object.

FIG. 17 illustrates example polygonal region display objects 1710 together with designated vertex positions 1720. Accordingly, after the user 105 generates the polygonal region display object 1710 with the operation input device 117, the user 105 can designate and drag an arbitrary vertex position 1720 to change the size or shape of the polygonal region display object 1710. The position of the region display object can be moved as described above. An arbitrary number of another region display objects including the polygonal region display object 1710 can be generated.

Returning back to FIG. 12, in step S1270, the location information editing unit 180 selects the location information corresponding to the location information display object positioned in the internal area of the region display object whose position and shape are determined by the operation in step S1260. The processing for determining whether the location information display object is inside or outside of the region indicated by the region display object can be performed on the captured image.

In this case, the location information display object needs not to be completely involved in the region display object. When at least part of the location information display object is involved in the region display object, the location information corresponding to the location information display object can be selected, regardless of a method for selecting the location information display object.

In this manner, by designating the polygonal region, the location information concentrated in a specific region can be more effectively and simultaneously selected than by individually designating the location information by clicking. The 2D region designation is not limited to usage of a rectangular region and a polygonal region. Any other method capable of selecting arbitrary location information is available.

Figure 13:
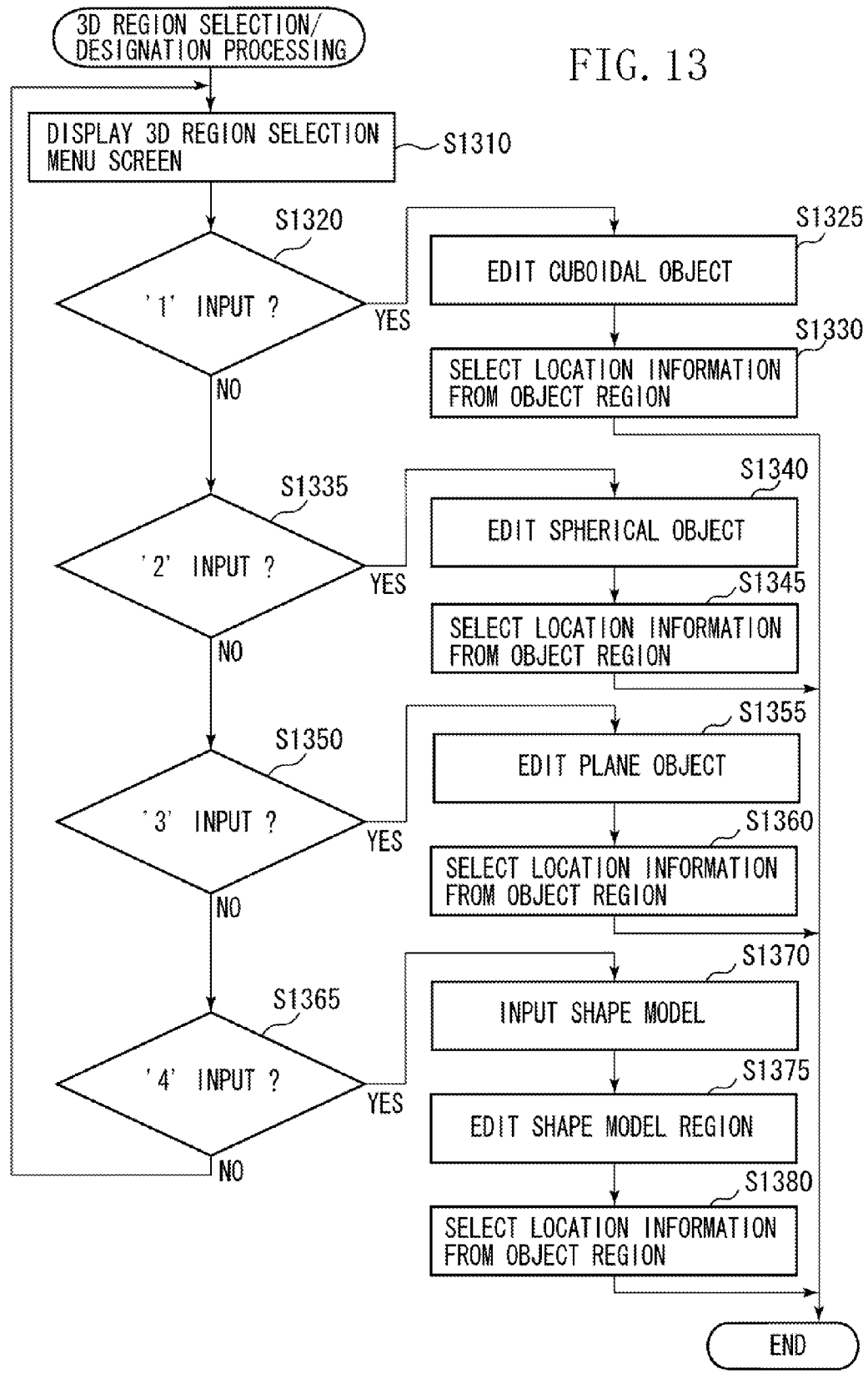
FIG. 13 is a flowchart illustrating three-dimensional (3D) region selection/designation processing.

FIG. 13 is a flowchart illustrating example processing performed in step S1195 to select and designate a 3D region.

Figure 18:
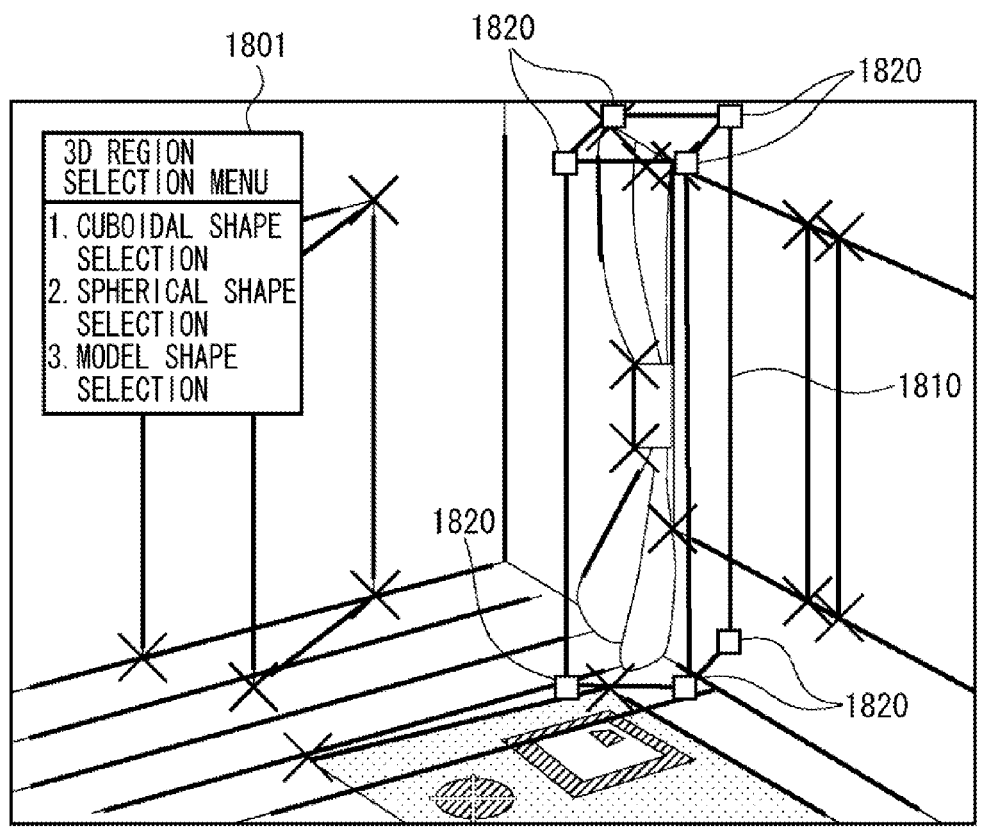

In step S1310, the location information editing unit 180 causes the HMD 115 to display a screen image illustrated in FIG. 18 on its display screen. FIG. 18 illustrates an example screen image displayed by the HMD 115 on its display screen in step S1310. In FIG. 18, a menu 1801 enables the user 105 to designate a selection method. When the menu 1801 is displayed, the user 105 can select "cuboidal shape selection" by designating the '1' key on the operation input device 117. The user 105 can select "spherical shape selection" by designating the '2' key. The user 105 can select "model shape selection" by designating the '3' key. Accordingly, in step S1320, if the '1' key is designated (YES in step S1320), the processing proceeds to step S1325. On the other hand, if the '1' key is not designated (NO in step S1320), the processing proceeds to step S1335.

In step S1325, the location information editing unit 180 locates a cuboidal virtual object (a cuboidal object 1810 in FIG. 18) having a predetermined size to a predetermined coordinate position in the physical space. Then, the location information editing unit 180 generates an image of the cuboidal object seen from the position/orientation of the camera 110 estimated by the imaging unit position/orientation estimation unit 185, and combines the generated image with the captured image sent to the HMD 115.

If the user 105 selects and moves vertices 1820 with the operation input device 117, the location information editing unit 180 moves the positions of the selected vertices 1820 according to a moving operation. Similarly, the location information editing unit 180 can move the cuboidal object 1810. Any method capable of moving the cuboidal object 1810 is usable. For example, the user 105 can operate a cursor key to move the cuboidal object 1810 and the vertices 1820 thereof. Moreover, a six-degrees-of-freedom sensor can be provided to enable the user 105 to move the cuboidal object 1810 and the vertices 1820 thereof according to a position of the six-degrees-of-freedom sensor in the three-dimensional space.

In step S1330, the location information editing unit 180 selects location information positioned in an internal area of the cuboidal object whose position and shape are determined by the operation in step S1320. The processing for determining whether the location information is inside or outside of the region indicated by the cuboidal object can be performed in the three-dimensional space.

If one of two points representing a line feature or at least one of four points representing vertices of a square marker is present in the three-dimensional region, it is regarded that the line feature or the square marker can be entirely selected.

In step S1335, if the '2' key is designated (YES in step S1335), the processing proceeds to step S1340. On the other hand, if the '2' key is not designated (NO in step S1335), the processing proceeds to step S1350.

In step S1340, the location information editing unit 180 locates a spherical virtual object (a spherical object) having a predetermined size to a predetermined coordinate position in the physical space. Then, the location information editing unit 180 generates an image of the spherical object seen from the position/orientation of the camera 110 estimated by the imaging unit position/orientation estimation unit 185, and combines the generated image with the captured image sent to the HMD 115.

If the user 105 changes a radius and a position/orientation of the spherical object with the operation input device 117, the location information editing unit 180 changes the radius and the position/orientation of the spherical object according to the user's operation. Moreover, the location information editing unit 180 can change the radius of the spherical object per axis (e.g., x-axis), to modify the spherical object into an elliptic object. Similar to the above-described cuboidal object, any method capable of moving the spherical object is available.

In step S1345, the location information editing unit 180 selects location information positioned in an internal area of the spherical object whose position and shape are determined by the operation in step S1340. The processing for determining whether the location information is inside or outside of the region indicated by the spherical object can be performed in the three-dimensional space.

In step S1350, if the "3" key is designated (YES in step S1350), the processing proceeds to step S1355. On the other hand, if the "3" key is not designated (NO in step S1350), the processing proceeds to step S1365.

In step S1355, the location information editing unit 180 locates a virtual plane object (a plane object) having a predetermined size to a predetermined coordinate position in the physical space. Then, the location information editing unit 180 generates an image of the plane object seen from the position/orientation of the camera 110 estimated by the imaging unit position/orientation estimation unit 185 and combines the generated image with the captured image sent to the HMD 115.

The plane object can be displayed as a mesh wire frame. The user 105 can operate (designate) a direction and a position of a normal of the plane object with the operation input device 117. The user 105 can use a mouse function or an input by a numerical pad to change the direction and the position of the normal. The location information editing unit 180 changes an inclination (or position) of the plane object based on an operation input by the user 105.

In step S1360, the location information editing unit 180 identifies a spatial region where the normal direction is designated, as a selected region, between two spatial regions divided by the plane indicated by the plane object determined by the operation in step S1355. Then, the location information editing unit 180 selects the location information positioned in the selected region.

For example, in the present exemplary embodiment, the location information in the spatial region within 10 cm from the floor can be selected by performing selection with a divided spatial region.

In step S1365, if the '4' key is designated (YES in step S1365), the processing proceeds to step S1370. On the other hand, the '4' key is not designated (NO in step S1365), the processing returns to step S1310.

In step S1370, the location information editing unit 180 locates a virtual object (shape model) having an arbitrary three-dimensional shape to a predetermined position/orientation in the physical space. The virtual object having an arbitrary three-dimensional shape is, for example, a three-dimensional virtual object created based on measurement of a desktop size and a leg height of the desk 100A, or a three-dimensional CAD model generated by 3-dimensional CAD software.

Accordingly, these virtual objects can be stored beforehand in an appropriate memory of the image processing apparatus 199 to enable the user 105 to select with the operation input device 117. A list of the virtual objects stored in the memory can be displayed on the display screen of the HMD 115 when the user 105 makes a selection. The virtual object having an arbitrary shape is required to have a "closed" internal area as a topological shape, to let the user 105 designate the spatial region.

The location information editing unit 180 generates an image of the shape model seen from the position/orientation of the camera 110 estimated by the imaging unit position/orientation estimation unit 185 and combines the generated image with the captured image sent to the HMD 115. The shape model can be displayed as a wired frame model.

In step S1375, if the user 105 selects and moves a vertex of the shape model with the operation input device 117, the location information editing unit 180 moves the designated vertex position according to the user's operation. Similarly, the location information editing unit 180 can change the position/orientation of the shape model.

In step S1380, the location information editing unit 180 selects location information positioned in an internal area of the shape model whose position and shape are determined by the operation in step S1375. In this manner, by using a prepared shape model indicating an arbitrary three-dimensional closed region, the location information about a movable specific object and its peripheral can be effectively selected and can be simultaneously disabled. The 3D region designation is not limited to usage of a cuboidal region, a spherical region, a plane region, and a shape model region. Any other method capable of selecting arbitrary location information is available.

Figure 14:
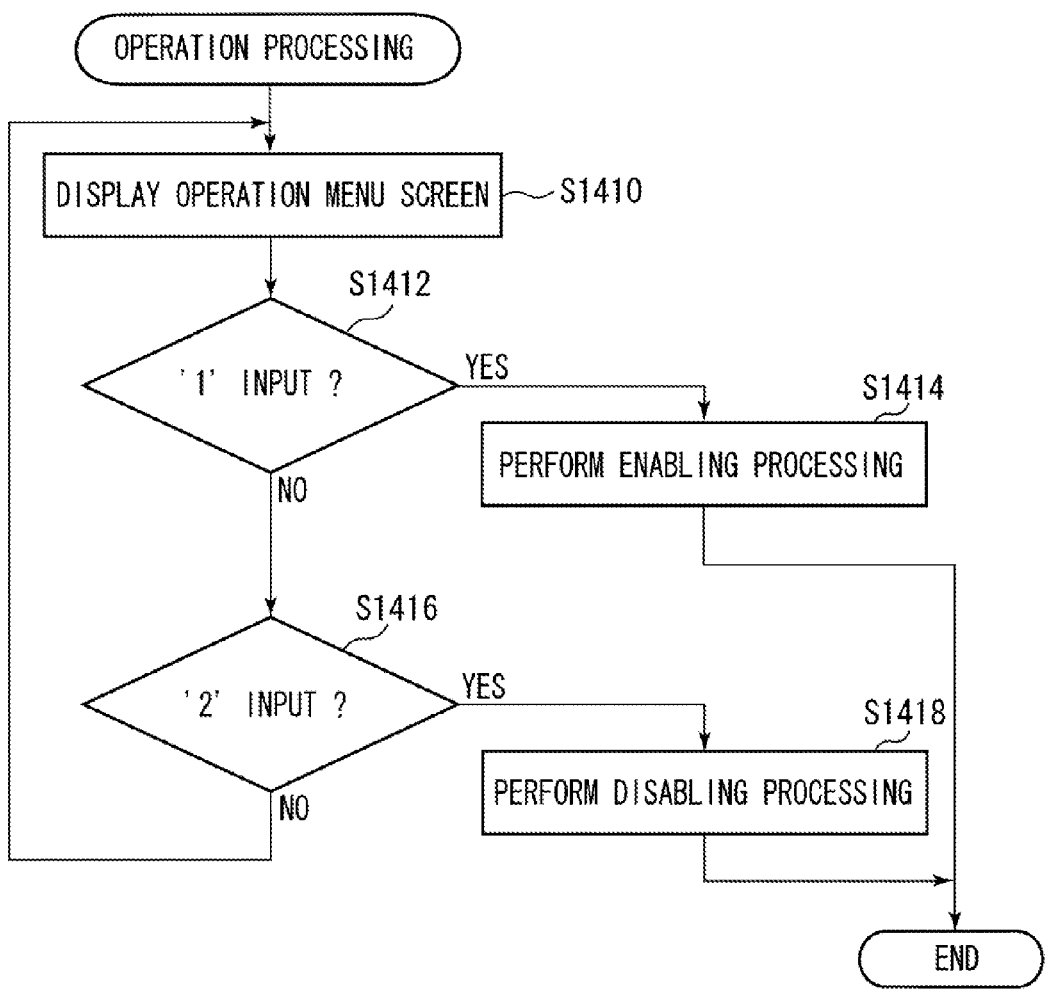
FIG. 14 is a flowchart illustrating location information operation processing.
Figure 19:
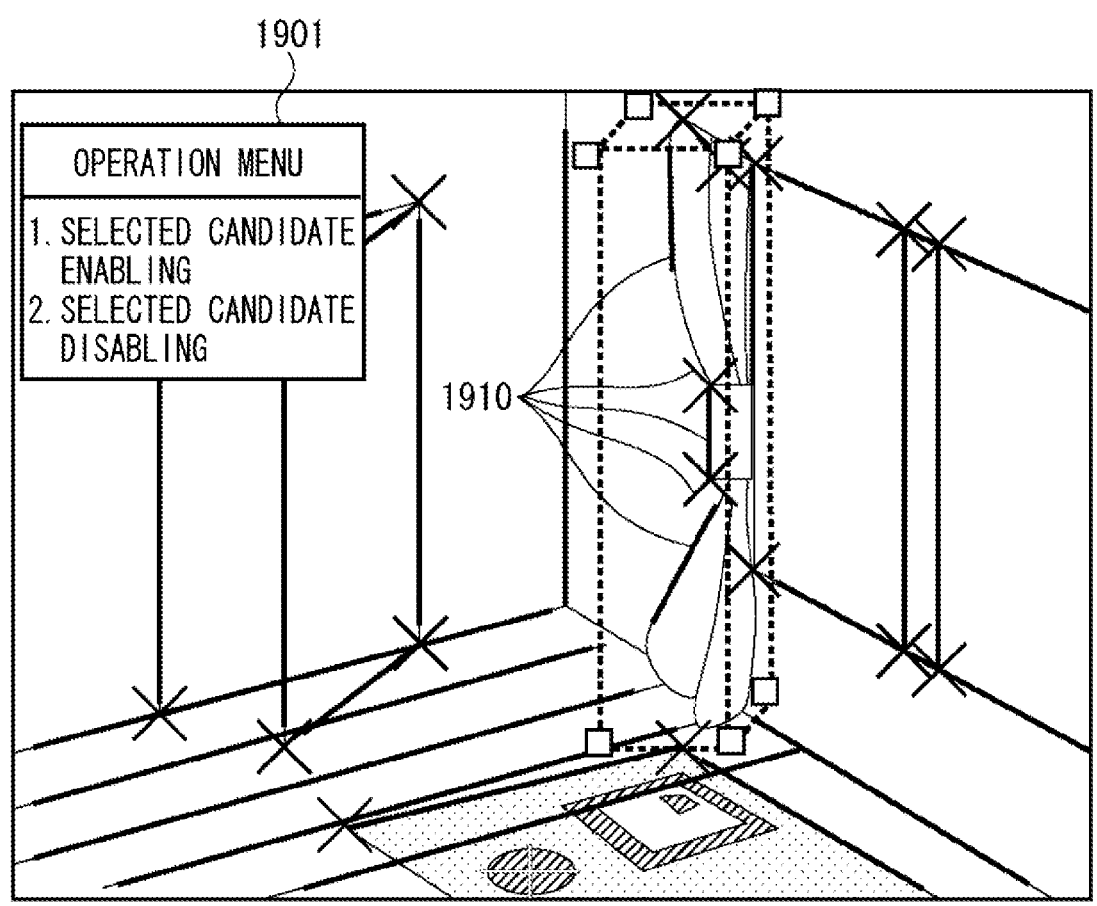

FIG. 14 is a flowchart illustrating detailed operation processing of the location information performed in step S1016. In step S1410, the location information editing unit 180 causes the HMD 115 to display a screen image illustrated in FIG. 19 on its display screen. FIG. 19 illustrates an example screen image displayed by the HMD 115 on its display screen in step S1410. In FIG. 19, a menu 1901 enables the user 105 to enable or disable a selected object. When the menu 1901 is displayed, the user 105 can select "selected candidate enabling" by designating the '1' key on the operation input device 117. The user 105 can select "selected candidate disabling" by designating the '2' key. Accordingly, in step S1412, if the '1' key is designated (YES in step S1412), the processing proceeds to step S1414. On the other hand, if the '1' key is not designated (NO in step S1412), the processing proceeds to step S1416.

In step S1414, the location information editing unit 180 sets the enabling state parameter of the currently selected location information (location information 1910 illustrated in FIG. 19) to "1." The currently selected location information is the location information whose selected state parameter is set to "1."

In step S1416, if the '2' key is designated (YES in step S1416), the processing proceeds to step S1418. On the other hand, if the '2' key is not designated (NO in step S1416), the processing returns to step S1410. In step S1418, the location information editing unit 180 sets the enabling state parameter of the currently selected location information whose selected state parameter is set to "1" (location information 1910 illustrated in FIG. 19) to "0."

As described above, the present exemplary embodiment can generate unknown shape information even when many of object shapes located in a space are unknown. Therefore, it is unnecessary to measure each shape beforehand. Requiring no input of shape information of the space in advance is desired to estimate camera position/orientation in a wide area. Moreover, a minimum amount of location information which is required by a user and used in the camera position/orientation estimation processing can be obtained by providing image feature editing processing together with automatic registration. Namely, the present exemplary embodiment can reduce erroneous recognition and decrease in processing speed in the camera position/orientation estimation processing. The problem that the geometric feature which needs to be selected again when the geometric feature is out of the frame discussed referring to the background art 1 can be eliminated.

Modified Embodiment 1

In the first exemplary embodiment, the imaging unit position/orientation estimation unit 185 sets one of three processing modes (automatic registration processing mode, editing processing mode, and application execution mode). However, a number of processing modes is not limited to three. For example, the automatic registration processing mode and the application execution mode can be integrated into a new application execution mode to reduce the number of processing modes.

A first modified exemplary embodiment is different from the first exemplary embodiment in the following points. The present modified exemplary embodiment does not include the processing of step S660 illustrated in FIG. 6. More specifically, the present modified exemplary embodiment changes the processing of step S630 and subsequent steps in the main processing that performs a display to notify a user of a geometric feature on a captured image. In the flowchart illustrated in FIG. 7 (i.e., step S630 in FIG. 6), the processing of step S790 is replaced with the processing of step S910 in FIG. 9.

According to the above-described modification, the user 105 can experience a content of a mixed reality while the automatic registration of feature location information is performed. If any location information that may decrease accuracy in estimating the position/orientation of the camera 110 is registered, the user 105 sets the editing processing mode with the operation input device 117 and disables unnecessary feature location information. Accordingly, the camera position/orientation estimation accuracy is prevented from deteriorating. Similarly, in the flowchart illustrated in FIG. 8, the processing of step S790 can be replaced with the processing of step S910 illustrated in FIG. 9. The user 105 can experience the content of the mixed reality while the location information selection is performed.

Modified Embodiment 2

In the first exemplary embodiment, the user 105 wears the HMD 115 on the head. However, when the user 105 holds the camera 110 in his/her hand to capture a physical space, the captured image can be displayed on a monitor of a work station instead of the HMD 115. Any apparatus capable of displaying a result obtained by the HMD 115 is usable. More specifically, a display unit of the HMD 115 can be used as a monitor independently connected to the image processing apparatus 199. The camera 110 can be separated from the HMD 115 so that the user 105 can hold it in his/her hand.

Modified Embodiment 3

In the first exemplary embodiment, the image input unit 120 acquires a real-time image (still image or moving image) captured by the camera 110 and sends the acquired image to the image feature detection unit 130 and the image storage unit 150. However, another method for acquiring an image is available. For example, a moving image captured by the camera 110 can be stored in a storage apparatus. The image input unit 120 can read the image from the storage apparatus.

A third modified exemplary embodiment is different from the first exemplary embodiment in the following points. The image input unit 120 reads a moving image from a storage apparatus and transmits a designated still image in the readout moving image or a still image of a frame determined based on a predetermined index to the image storage unit 150 and the image feature detection unit 130.

If an instruction (playback, rewind, fast-forward, frame-rewind, frame-forward) is received from the user 105 (via the operation input device 117), the image input unit 120 extracts a still image from a moving image according to the instruction. The extracted still image can be displayed on the HMD 115. The location information editing unit 180 performs editing on the feature location information of the still image extracted from the moving image.

The present modified exemplary embodiment basically performs processing according to the flowcharts illustrated in FIGS. 6 to 14. However, in step S705 of FIGS. 7 to 9, the image input unit 120 acquires the captured image of one frame from the storage apparatus storing the moving image, not from the camera 110.

In this manner, the present modified exemplary embodiment can solve the problem discussed in the background art 1 (i.e., the problem that a disabled state of an image feature is not continuously maintained when an object including the image feature to be disabled in obtaining camera position/orientation data is once removed from a frame and again restored to the frame). More specifically, the present modified exemplary embodiment can solve the above-described problems by selecting a geometric feature whose location information in a three-dimensional space is estimated, without selecting the image feature detected on the image.

As another effect, when the location information editing unit 180 edits the feature location information detected from the moving image, the user 105 can check the feature location information to be selected through the entire sequence of the moving image to obtain an accurate camera position/orientation estimation result. Moreover, only the application execution mode can be executed even when the moving image is acquired.

Modified Embodiment 4

In the first exemplary embodiment, the location information generation unit 140 obtains location information of an unknown geometric feature from a plurality of images captured by the camera 110, and registers the obtained location information in the location information storage unit 160. However, instead of automatically generating and registering the location information of the unknown geometric feature, known feature location information prepared beforehand can be used.

For example, the location information storage unit 160 can store point features and line features representing vertices and edge shapes of a 3-dimensional CAD model disposed as a physical object in the physical space. For example, the point features and the line features obtained beforehand from the physical object can be used to estimate the position/orientation of a specific camera, such as a single-lens reflex camera which captures an image of a complicated physical object. Further, optimum feature location information can be generated by editing and disabling an unnecessary portion in the feature point or the line feature of the 3-dimensional CAD model.

A fourth modified exemplary embodiment is different from the first exemplary embodiment in the following points. An image processing apparatus according to the present modified exemplary embodiment has a functional configuration similar to that illustrated in FIG. 1 and different in that the location information generation unit 140 is removed and the location information storage unit 160 stores feature location information converted from shape models beforehand.

An image feature detected by the image feature detection unit 130 is directly sent to the imaging unit position/orientation estimation unit 185. The imaging unit position/orientation estimation unit 185 estimates position/orientation of the camera 110 based on the feature location information stored in the location information storage unit 160. According to the present modified exemplary embodiment, the image processing apparatus 199 does not perform the processing of steps S620 and S630 illustrated in FIG. 6 and executes either the application execution mode or the editing processing mode.

Modified Embodiment 5

In the first exemplary embodiment, the HMD 115 projects location information of a geometric feature on an imaging plane based on the position/orientation of the camera 110 estimated by the imaging unit position/orientation estimation unit 185 and displays a location information display object at the projection position. However, the projection can be also performed on an imaging plane at another visual point, other than the imaging plane of the camera 110.

For example, viewing from a relatively far place or looking up from the bottom may be desirable to easily check and understand an amount or a selection status of the feature location information registered by the location information generation unit 140. However, as the camera 110 cannot be moved to the underground, it is important to set a visual point other than the camera 110 as a method for confirming the state of the feature location information.

A fifth modified exemplary embodiment is different from the first exemplary embodiment in the following points. The user 105 inputs, via the operation input device 117, position/orientation information of a visual point to confirm the feature location information. Then, the user 105 performs an input operation to generate an image seen from the visual point. In the present modified exemplary embodiment, such an instruction is received in step S790 illustrated in FIGS. 7 and 8.

Then, the present modified exemplary embodiment performs the processing described in the first exemplary embodiment using the accepted visual point instead of using the camera 110. If visibility deteriorates due to a background image when performing a projection display of the feature location information, the background image can be set in a monochromatic color (such as black).

More specifically, the present modified exemplary embodiment includes obtaining a region corresponding to location information on a plane determined by the position/orientation of the visual point designated by a user, based on the position/orientation of the visual point, and outputting a virtual image including a predetermined image displayed in the obtained region. Alternatively, either the virtual image or an updated captured image can be output according to the user's instruction entered via the operation input device 117.

Second Exemplary Embodiment

A second exemplary embodiment causes a computer to execute a software program capable of realizing functions comparable to those of the image feature detection unit 130, the location information generation unit 140, the imaging unit position/orientation estimation unit 185, the location information editing unit 180, and the combining unit 195 of the image processing apparatus 199 illustrated in FIG. 1. A memory device, such as a random access memory (RAM) or a hard disk, can serve as the image storage unit 150 and the location information storage unit 160. An interface (I/F) is operable as the image input unit 120 and the operation input unit 170.

Accordingly, when the above-described computer program is installed on the computer including the above-described memory device and the interface, the computer executes the computer program to perform an operation similar to that realized by the image processing apparatus 199.

Figure 22:
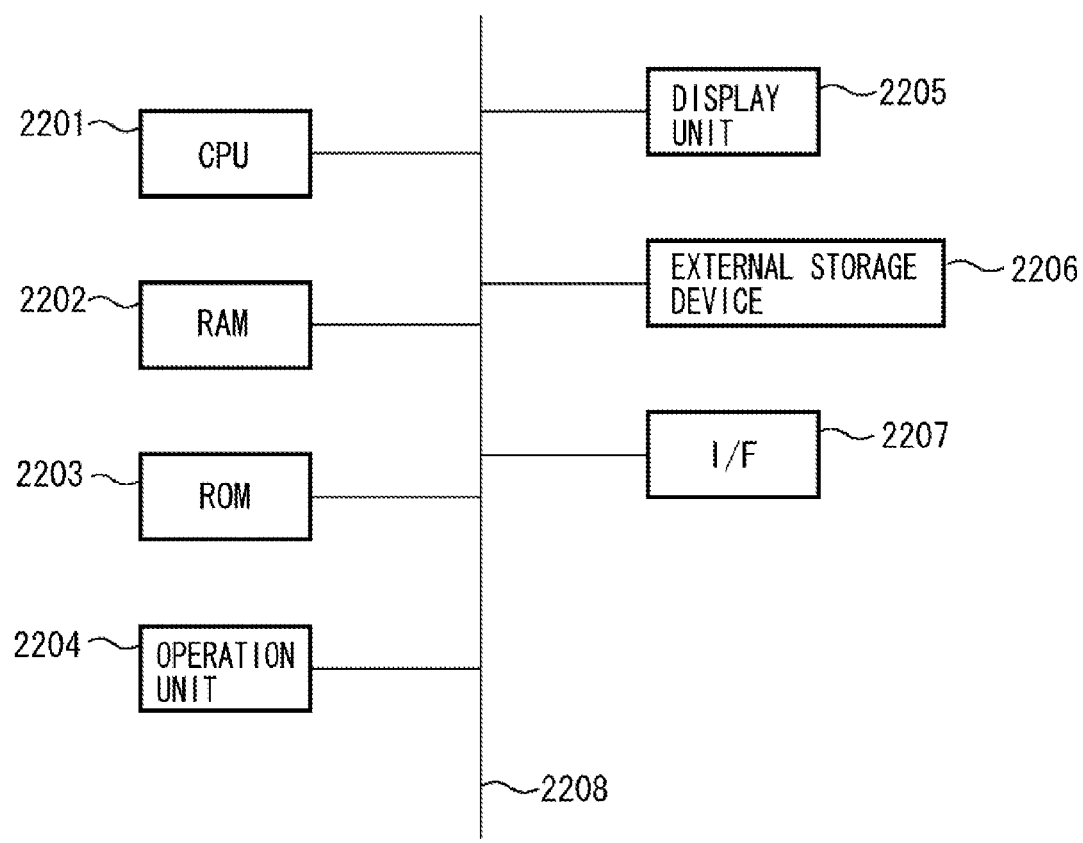
FIG. 22 is a block diagram illustrating a hardware configuration of a computer applicable to an image processing apparatus.

FIG. 22 is a block diagram illustrating an example hardware configuration of a computer which is operable as the image processing apparatus 199. A central processing unit (CPU) 2201 performs control and various processing of the computer (the above-described processing performed by the image processing apparatus 199) according to a program and data stored in a random access memory (RAM) 2202 or a read only memory (ROM) 2203.

The RAM 2202 includes an area temporarily storing program (s) and data loaded from an external storage device 2206 and data received from an external device via an interface (I/F) 2207. Further, the RAM 2202 includes a work area for the CPU 2201 that executes various processing. More specifically, the RAM 2202 can appropriately provide various areas. The ROM 2203 stores a boot program and setting data for the computer.

An operation unit 2204 includes a keyboard and a mouse that enables an operator of the computer (e.g., the user 105) to input various instructions to the CPU 2201. A display unit 2205 which can be constituted by a cathode ray tube (CRT) or a liquid crystal screen can display an image or a text resulting from the processing by the CPU 2201. The external storage device 2206 is a mass-storage device for information, represented by a hard disk. The external storage device 2206 stores an operating system (OS) and the following information.

For example, the external storage device 2206 stores software program(s) which cause the CPU 2201 to execute processing functionally comparable to the processing performed by the image feature detection unit 130, the location information generation unit 140, the imaging unit position/orientation estimation unit 185, the location information editing unit 180, and the combining unit 195. In addition, the external storage device 2206 can function as the image storage unit 150 and the location information storage unit 160. Thus, the external storage device 2206 can store various information/data storable in the image storage unit 150 and the location information storage unit 160.

More specifically, the external storage device 2206 stores the various information/data which were "stored" in the above described description. The various information/data stored in the external storage device 2206 can be appropriately loaded to the RAM 2202 under the control of the CPU 2201. The CPU 2201 processes the loaded information/data. The interface 2207 can function as the image input unit 120 and the operation input unit 170. The HMD 115 and the operation input device 117 are connected to the interface 2207 via a bus 2208. An independent interface can be provided for each of the HMD 115 and the operation input device 117.

Other Exemplary Embodiment

Software program code for realizing the functions of the above-described exemplary embodiments is installable to a system or an apparatus including various devices via a computer-readable storage medium. A computer (or CPU or micro-processing unit (MPU)) in the system or the apparatus can execute the program code read from the storage medium to operate the devices to realize the functions of the above-described exemplary embodiments. Accordingly, the program code itself can realize the functions of the exemplary embodiments and the present invention encompasses the program code and the storage medium storing the program code.

Moreover, an operating system (OS) or other application software running on a computer can execute part or all of actual processing to realize the functions of the above-described exemplary embodiments based on instructions of the programs read out and executed by the computer. Additionally, the program code read out of the storage medium can be written into a memory of a function expansion card inserted in a computer and a memory of a function expansion unit equipped in the computer. In this case, based on an instruction of the program, a CPU provided on the function expansion card and the function expansion unit can execute part or all of the processing to realize the functions of the above-described exemplary embodiments. The present invention encompasses the above-described storage medium storing program code corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:
1. An image processing apparatus comprising:
a processor and memory;
an acquisition unit configured to acquire an image from an imaging apparatus that captures an image of a physical space;

a detection unit configured to detect at least one image feature from the acquired image;

a generation unit configured to generate a combined image by combining a predetermined object which indicates the detected image feature with the captured image;

a display unit configured to display the combined image to a user; and an obtaining unit configured to obtain a position and an orientation of the imaging apparatus based on a three-dimensional position of the detected image feature and a user's instruction indicating whether the detected image feature is a disabled image feature or an enabled image feature, wherein the display unit displays a feedback image to the user on the basis of the position and the orientation of the imaging apparatus, and wherein at least one of the units is implemented upon execution of instructions stored in the memory by the processor.

2. The image processing apparatus according to claim 1, wherein the detected image feature includes at least one of a feature detected as a point, a feature detected as a line, and a feature detected as a polygonal shape on the captured image.

3. The image processing apparatus according to claim 1, wherein the captured image is an image of each frame constituting a moving image of the physical space.

4. A method for processing an image comprising:

acquiring an image from an imaging apparatus that captures an image of a physical space;

detecting at least one image feature from the acquired image;

generating a combined image by combining a predetermined object which indicates the detected image feature with the captured image;

displaying the combined image to a user;

obtaining a position and an orientation of the imaging apparatus based on a three-dimensional position of the detected image feature and a user's instruction indicating whether the detected image feature is a disabled image feature or an enabled image feature; and displaying a feedback image to the user on the basis of the position and the orientation of the imaging apparatus.

5. A non-transitory computer readable medium containing computer-executable instructions utilized in an image processing apparatus for processing an image, the medium comprising:

computer-executable instructions for acquiring an image from an imaging apparatus that captures an image of a physical space;

computer-executable instructions for detecting at least one image feature from the acquired image;

computer-executable instructions for generating a combined image by combining a predetermined object which indicates the detected image feature with the captured image;

computer-executable instructions for displaying the combined image to a user;

computer-executable instructions for obtaining a position and an orientation of the imaging apparatus based on three-dimensional position of the detected image feature and the user's instruction indicating whether the detected image feature is a disabled image feature or an enabled image feature; and computer-executable instructions for displaying a feedback image to the user on the basis of the position and the orientation of the imaging apparatus.

6. The method for processing an image according to claim 4, wherein the detected image feature includes at least one of a feature detected as a point, a feature detected as a line, and a feature detected as a polygonal shape on the captured image.

7. The method for processing an image according to claim 4, wherein the captured image is an image of each frame constituting a moving image of the physical space.

8. The medium for processing an image according to claim 5, wherein the detected image feature includes at least one of a feature detected as a point, a feature detected as a line, and a feature detected as a polygonal shape on the captured image.

9. The medium for processing an image according to claim 5, wherein the captured image is an image of each frame constituting a moving image of the physical space.

10. The image processing apparatus according to claim 1, further comprising a derivation unit configured to derive location information of the detected image feature based on an image coordinate of the detected image feature, wherein the obtain unit obtains the position and the orientation of the imaging apparatus based on the location information of the image feature except for the disable image feature.

* * * * *